United States Patent
Sasaki et al.

(10) Patent No.: US 8,394,867 B2
(45) Date of Patent: Mar. 12, 2013

(54) POLYPROPYLENE RESIN FOAMED BEAD AND MOLDED ARTICLE THEREFROM

(75) Inventors: Hidehiro Sasaki, Kawachi-gun (JP); Yasunori Nakamura, Yokkaichi (JP)

(73) Assignee: JSP Corporation, Tokyo (JP)

( * ) Notice: Subject to any disclaimer, the term of this patent is extended or adjusted under 35 U.S.C. 154(b) by 499 days.

(21) Appl. No.: 12/451,334

(22) PCT Filed: Apr. 16, 2008

(86) PCT No.: PCT/JP2008/057398
§ 371 (c)(1), (2), (4) Date: Nov. 6, 2009

(87) PCT Pub. No.: WO2008/139822
PCT Pub. Date: Nov. 20, 2008

(65) Prior Publication Data
US 2010/0137466 A1 Jun. 3, 2010

(30) Foreign Application Priority Data

May 9, 2007 (JP) .................................. 2007-125058

(51) Int. Cl.
C08J 9/00 (2006.01)
C08J 9/16 (2006.01)
C08J 9/22 (2006.01)
C08J 9/228 (2006.01)
C08J 9/35 (2006.01)

(52) U.S. Cl. ............. 521/56; 521/142; 521/143; 521/77
(58) Field of Classification Search .................... 521/58, 521/143, 142, 77
See application file for complete search history.

(56) References Cited

U.S. PATENT DOCUMENTS

| 3,770,663 | A | 11/1973 | Ueki et al. |
| 4,777,000 | A | 10/1988 | Kuwabara et al. |
| 5,747,549 | A | 5/1998 | Tsurugai et al. |
| 5,968,430 | A | 10/1999 | Naito et al. |
| 6,214,896 | B1 * | 4/2001 | Mogami et al. ................. 521/58 |
| 2003/0124335 | A1 | 7/2003 | Sasaki et al. |

FOREIGN PATENT DOCUMENTS

| EP | 1 016 690 A2 | 7/2000 |
| EP | 0 611 795 B2 | 7/2003 |
| JP | B-49-002183 | 1/1974 |
| JP | B2-56-001344 | 1/1981 |
| JP | B2-62-061227 | 12/1987 |
| JP | B2-04-046217 | 7/1992 |
| JP | B2-06-049795 | 6/1994 |
| JP | A-06-240041 | 8/1994 |
| JP | A-08-277340 | 10/1996 |
| JP | A-09-104026 | 4/1997 |
| JP | A-09-104027 | 4/1997 |
| JP | A-10-180888 | 7/1998 |
| JP | A-10-226712 | 8/1998 |
| JP | A-10-292064 | 11/1998 |
| JP | A-11-100468 | 4/1999 |
| JP | A-11-246699 | 9/1999 |
| JP | A-2000-000894 | 1/2000 |
| JP | A-2000-290419 | 10/2000 |
| JP | A-2002-200635 | 7/2002 |
| JP | A-2008-069186 | 3/2008 |

OTHER PUBLICATIONS

International Search Report issued in International Application No. PCT/JP2008/057398; Mailed on Jun. 10, 2008.
Supplementary European Search Report issued in EP 08 75 1851 on Jan. 25, 2012.

\* cited by examiner

*Primary Examiner* — Randy Gulakowski
*Assistant Examiner* — Kara Boyle
(74) *Attorney, Agent, or Firm* — Oliff & Berridge, PLC

(57) ABSTRACT

Improved polypropylene resin foamed beads that without detriment to the excellence in properties, such as compression properties and heat resistance, characterizing the polypropylene resin foamed beads, can provide a polypropylene resin foamed bead molded article with equal properties by an molding conducted at low heating temperature. There are disclosed polypropylene resin foamed beads composed of a polypropylene resin of 115 to 135° C. melting point and 500 MPa or higher Olsen flexural modulus. The amount of ash at the surface of the foamed beads is 3000 wt. ppm or less (including 0). With respect to the foamed beads, in the first DSC curve obtained by heating 1 to 3 mg of polypropylene resin foamed beads from room temperature to 200° C. at a temperature elevation rate of 10° C./min by the use of a differential scanning calorimeter, there appear not only one or more endothermic peak (Pa) having the peak temperature within a temperature zone not higher than the melting point of the resin but also one or more endothermic peak (Pb) having the peak temperature within a temperature zone exceeding the melting point of the resin and not lower than 130° C. The total calorific value of the endothermic peak (Pb) is in the range of 2 to 12 J/g. Further, there is disclosed a foamed bead molded article obtained by molding the above foamed beads.

7 Claims, 3 Drawing Sheets

POLYPROPYLENE RESIN FOAMED BEAD AND MOLDED ARTICLE THEREFROM

TECHNICAL FIELD

The present invention relates to polypropylene resin foamed beads and a polypropylene resin foamed bead molded article obtained by molding the foamed beads and particularly to polypropylene resin foamed beads excellent in low-temperature formability and a polypropylene resin form particle molded article excellent in external appearance, compression physical properties and heat resistance obtained from the foamed beads.

BACKGROUND ART

From movement toward plastic material integration in various industries in recent years, particularly a polypropylene resin is expanding industrial fields because of its excellence in the balance among mechanical strength, heat resistance, processability and price and because of its excellent properties in easy combustibility and easy recyclability. Similarly, polypropylene resin foamed bead molded articles obtained by molding of polypropylene resin foamed beads can be endowed with characteristics such as lightweight properties, shock-absorbing characteristics and thermal insulating properties without losing excellent properties of the polypropylene resin and are thus widely used as packaging materials, building materials, insulator materials, automotive materials etc.

A polypropylene resin foamed bead molded article obtained by molding polypropylene resin foamed beads is superior to a polystyrene resin foamed bead molded article in heat resistance, chemical resistance, rigidity, and compression strain recovery. On the other hand, when polypropylene resin foamed beads are secondarily foamed and simultaneously fused in molding, high-temperature heating as compared with molding of polystyrene resin foamed beads, that is, heating by steam at high saturation vapor pressure, is necessary. Accordingly, a mold with high pressure-proof specifications and a dedicated molding machine for high press pressure are necessary, and energy costs used therefor is also high.

To solve this problem, a method of coating the surfaces of polypropylene resin foamed beads with low-melting different resins is also carried out (for example, Patent Document 1), but the apparatus used in this coating is complicated and the production process thereof is also complicated, and the mutual fusion of the resin particles in molding is improved, but because the secondary foaming of the foamed beads is not sufficient, there remains room for improvement in the external appearance of the molded article, and for the purpose of improving the secondary foaming property of foamed beads for solving this problem, there is necessity for a step of giving internal pressure for significantly increasing the internal pressure of foamed beads, for molding by in-mold filling at high compression ratio, or for increase of steam pressure during a molding opposite to desired objects.

There is also a method of using a relatively low-melting polypropylene resin as a base resin, and polypropylene resin foamed beads using, as a base resin, a polypropylene resin polymerized by using a metallocene polymerization catalyst are known (for example, Patent Document 2). The polypropylene resin polymerized using the metallocene polymerization catalyst gives a low-melting resin more easily than with a polypropylene resin polymerized with the conventional Ziegler-Natta catalyst, but there is still room for improvement in the effect of reducing the saturation vapor pressure of steam necessary as a heating medium during a molding, or for maintaining excellent properties such as mechanical strength and heat resistance inherent in the polypropylene resin.

Non-crosslinked foamed beads using a modified polypropylene resin as a base resin having [content of a polypropylene resin]/[content of a polymer composed of a vinyl monomer] at a ratio of 97 to 65% by weight/3 to 35% by weight, obtained by graft-polymerizing a polypropylene resin impregnated with a vinyl monomer are known (for example, Patent Document 3). The heat resistance performance of foamed beads using the modified polypropylene resin particles as the base resin tends to depend on state transition unique to the high-molecular polymer such as melting point or glass transition temperature, and by selecting a polypropylene resin having a low melting point, the saturation vapor pressure of steam during a molding can be reduced, but there remains a problem in maintenance of heat resistance.

Patent Document 1: JP-A 2000-894
Patent Document 2: JP-A 6-240041
Patent Document 3: JP-A 10-292064

DISCLOSURE OF INVENTION

Problems to be Solved by the Invention

The present invention was made in view of these circumstances, and an object of the present invention is to provide excellent polypropylene resin foamed beads which can give a polypropylene resin foamed bead molded article having equivalent properties in molding at low heating temperature without deteriorating excellent properties such as compression physical properties and heat resistance that are characteristics of a polypropylene resin foamed bead molded article obtained by molding at conventional high heating temperature.

Another object of the present invention is to provide a polypropylene resin foamed bead molded article having excellent external appearance, compression physical properties and heat resistance which is obtained by molding the polypropylene resin foamed beads.

Means to Solve the Problems

The present inventors made extensive study to solve the problem described above, and as a result, they found that excellent molding of foamed beads is realized at low heating temperature, and simultaneously the excellent external appearance, compression physical properties and heat resistance of the resulting foamed bead molded article can be maintained, by regulating the relationship between specific physical properties of a resin base material and compression physical properties of a foamed bead molded article, the relationship between the crystal structure of foamed beads and the heat resistance of a foamed bead molded article, the relationship between the crystal structure of foamed beads or the behavior of the foamed beads during molding and moldability of foamed beads, and elucidation of mutual balance of these relationships and by regulating the crystal structure of foamed beads with a polypropylene resin as base resin having a specific melting point and flexural elastic modulus, and the present invention was thereby completed.

That is, the gist of the present invention lies in:
[1] Polypropylene resin foamed beads comprising a polypropylene resin having a melting point of 115 to 135° C. and an Olsen flexural modulus of 500 MPa or more, wherein the amount of ash on the surfaces of the foamed beads is 3,000 ppm by weight or less (including 0), the foamed beads show not only one or more endothermic peaks (Pa) having a peak temperature in a temperature region not higher than the melting point of the resin but also one or more endothermic peaks (Pb) having a peak temperature in a temperature region exceeding the melting point of the resin and not lower than 130° C., in a first DSC curve obtained by heating 1 to 3 mg of polypropylene resin foamed beads when heated from room temperature to 200° C. at a rate of temperature rise of 10° C./min with a heat flux differential scanning calorimeter, and the total calorie of the endothermic peaks (Pb) is in the range of 2 to 12 J/g,

[2] The polypropylene resin foamed beads according to the above-mentioned [1], wherein the expansion ratio (maximum expansion particle ratio by heating/expansion particle ratio before heating) by heating with steam at a saturation vapor pressure of 0.15 MPa (G) is 1.3 to 3.5,

[3] The polypropylene resin foamed beads according to the above-mentioned [1] or [2], wherein the average cell diameter of the polypropylene resin foamed beads is 50 to 350 μm,

[4] The polypropylene resin foamed beads according to any one of the above-mentioned [1] to [3], wherein the Olsen flexural modulus of the polypropylene resin and the melting point of the resin satisfies the following formula (1):

$$(\text{Olsen flexural modulus [MPa]}+1400)/15 \geq \text{resin melting point (° C.)} \geq (\text{Olsen flexural modulus [MPa]}+1750)/20 \quad (1)$$

[5] The polypropylene resin foamed beads according to any one of the above-mentioned [1] to [4], wherein the polypropylene resin is a copolymer of propylene and ethylene and/or α-olefin having 4 to 20 carbon atoms,

[6] The polypropylene resin foamed beads according to the above-mentioned [1], wherein the melting point of the polypropylene resin is 115° C. or more and less than 130° C.,

[7] The polypropylene resin foamed beads according to the above-mentioned [1], wherein the melting point of the polypropylene resin is 130° C. to 135° C., and

[8] A polypropylene resin foamed bead molded article which is prepared by molding the polypropylene resin foamed beads according to any one of the above-mentioned [1] to [7].

Effect of the Invention

The polypropylene resin foamed beads of the present invention can provide a foamed bead molded article which is excellent in mold reproducibility and dimensional stability with low molding temperature (by heating with steam at low saturation vapor pressure) and excellent in external appearance such as surface smoothness and in mutual fusion of foamed beads, and a foamed bead molded article obtained by molding the foamed beads of the present invention, even in respect of the excellent compression physical property, rigidity and heat resistance inherent in the polypropylene resin foamed bead molded article, is comparable to conventional products formed at conventional high molding temperature. Further, the foamed beads of the invention and its molded article are also excellent in easy combustibility and easy recyclability.

The polypropylene resin foamed beads of the present invention enable molding at low molding temperature, thereby enabling significant reduction in energy cost during forming as compared with the conventional molding of polypropylene resin foamed beads and simultaneously enabling use of steam at low saturation vapor pressure during molding, and thus the clamping pressure of a molding machine can be reduced and the thickness of a mold can be made thin so that the molding machine and the mold can be designed at low pressure, and therefore, inexpensive design is feasible in molding facilities, and existing facilities for molding of polystyrene resin foamed beads are usable for polypropylene resin foamed beads.

DESCRIPTION OF REFERENCE NUMERALS

Figure 1:
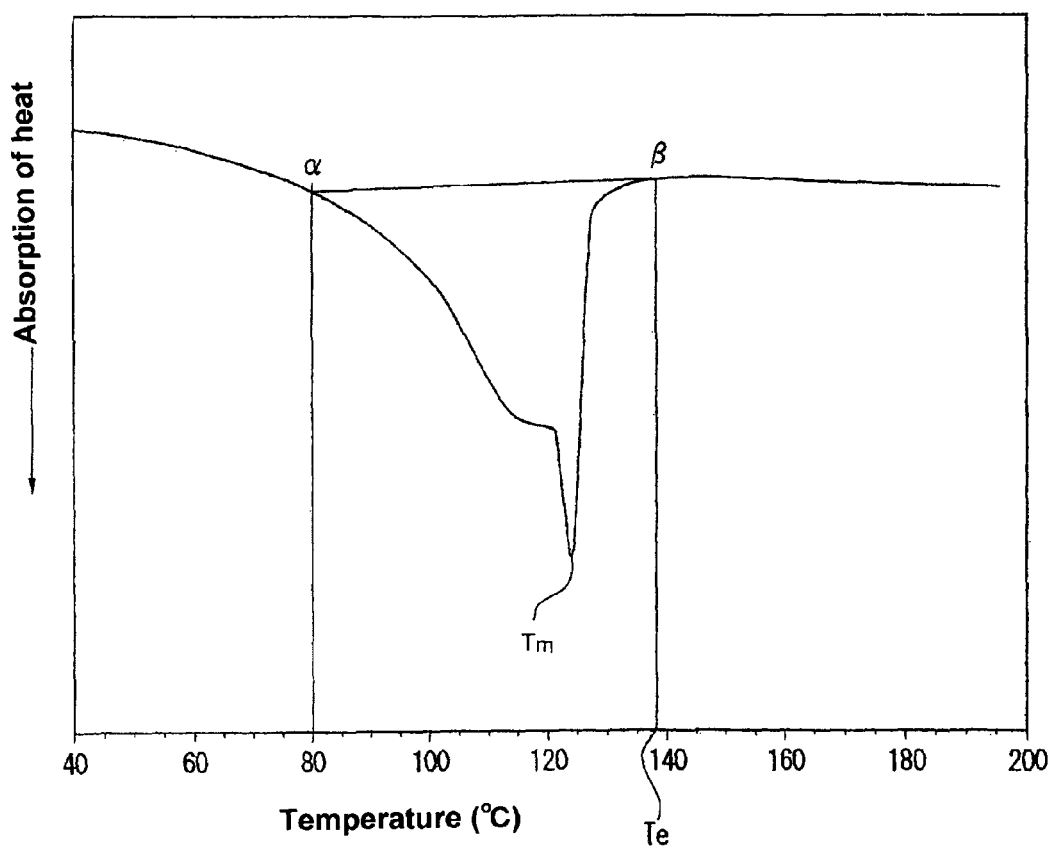
FIG. 1 is a diagram showing a second DSC curve of a base resin.

Pa: inherent peak
Pb: high-temperature peak
PTma: peak temperature (i.e. apex temperature) of inherent peak
PTmb: peak temperature (i.e. apex temperature) of high-temperature peak
Tm: resin melting point
Te: melting termination temperature
a1, a2, a3: endothermic peaks

BEST MODE FOR CARRYING OUT THE INVENTION

The polypropylene resin foamed beads of the present invention are polypropylene resin foamed beads enabling molding at a low molding temperature equal to energy consumption required in molding of a polystyrene resin foamed bead molded article, and a foamed bead molded article obtained from the polypropylene resin foamed beads does not deteriorate excellent properties such as mechanical strength and thermal resistance that are characteristics of a foamed bead molded article obtained from conventionally widely used polypropylene resin foamed beads.

To realize molding of polypropylene resin foamed beads comparable to energy consumption required for molding of polystyrene resin foamed beads, the maximum saturated vapor pressure of steam flowing into a mold when foamed beads are formed in a mold by molding should be 0.18 MPa (G) or less, more preferably 0.15 MPa (G) or less which is preferable for obtaining a polystyrene resin foamed bead molded article. In the present invention, therefore, a low-melting polypropylene resin is used as a base resin.

In known art, on the other hand, there is a technique of producing a non-crosslinked polypropylene resin foamed bead molded article by using foamed beads forming crystals fusing in a temperature range not lower than the melting point by isothermal crystallization of the polypropylene resin during production of non-crosslinked polypropylene resin foamed beads.

The presence of crystals fusing in a temperature range not lower than the resin melting point can be confirmed as a high-temperature peak in a DSC curve by differential scanning calorimetry of the foamed beads. The object of formation of high-temperature peak was significant due to prevention of an unique rapid change in viscosity of propylene resin, in molding of foamed beads by heating with steam, and the result was known to be effective in expansion of the range of forming heating temperature by steam during molding, in prevention of the shrinkage of a foamed bead molded article after forming, and in maintenance of rigidity. However, the influence on the heat resistance performance of high-temperature peak is not known.

The present inventors found that this high-temperature peak contributes to maintenance of heat resistance performance and also found that when the crystal structure of the foamed beads is regulated such that a high-temperature peak having a peak temperature (i.e. apex temperature) is located in a temperature range at 130° C. or more, preferably 135° C. or more in a DSC curve of the foamed beads, practical heat resistance performance can be maintained similar to the conventional polypropylene resin foamed bead molded article.

However, even if a high-temperature peak having a peak temperature (i.e. apex temperature) higher than the melting point of the base resin and a high-temperature peak not lower than 130° C. is obtained by regulating the crystal structure of foamed beads obtained from a polypropylene resin having a low melting point of 135° C. or less as a base resin, the foamed beads do not become foamed beads excellent in the secondary foaming property and fusion of foamed beads by heating with steam at a saturation vapor pressure of 0.18 MPa (G) in molding, thus failing to provide an excellent foamed bead molded article.

Hence, the inventors' finding is that foamed beads used in molding when heated can become firstly mutually fused and then can become secondarily foamed (hereinafter, the foamed beads having this property are referred to as fusion preceding foamed beads), and the foamed beads are heated, whereby the foamed beads can become secondarily foamed and then can become mutually fused (hereinafter, the foamed beads having this property are referred to as secondary foaming preceding foamed beads), and in the technique described above, the fusion preceding foamed beads among both the foamed beads are more preferable in molding, and consideration of the fusion preceding foamed beads is particularly important in examining development of polypropylene resin foamed beads is important in molding of polypropylene resin foamed beads by heating with steam at a saturation vapor pressure of 0.18 MPa (G) or less, which overthrows the past common knowledge of molding of polypropylene resin foamed beads.

That is, when the molding of polypropylene resin foamed beads necessitating heating with steam at higher saturation vapor pressure than in the molding of polystyrene resin foamed bead molded article is made equal to energy consumption required for forming of polystyrene resin foamed beads, it was necessary that the efficient consumption of steam in heating with steam at lower saturation vapor pressure than conventional, and therefore, it has been necessary that the foamed beads be fusion preceding foamed beads and have properties by which mutual fusion and secondary foaming occur in a near heating temperature range.

The reason that the fusion preceding foamed beads are more preferable is that in the case of the secondary foaming preceding particles, the spaces among foamed beads filled in mold by secondary foaming of the foamed beads are easily clogged in a heating step during the molding, thus preventing inflow and passage of steam to the spaces among the foamed beads, resulting in causing inhibition of mutual fusion of the foamed beads, while the fusion preceding foamed beads hardly cause such a thing. The reason that the mutual fusion and secondary foaming of the foamed beads are preferably in a near heating temperature range is that simply the fusion preceding foamed beads are fused, but when the initiation temperature of secondary foaming is too significantly higher than the fusion temperature, the heating temperature at the time of molding should be inevitably increased in order to obtain the foamed bead molded article having an excellent appearance etc.

To obtain the fusion preceding foamed beads having mutual fusion of the foamed beads and secondary foaming in a near heating temperature range, it is important that the high-temperature peak calorie governing the secondary foam performing of the foamed beads under predetermined heating that is a major factor directly governing the molding be made appropriated, the adhesion amount of a dispersant be made suitable on the surface of the foamed bead for fusion of individual foamed beads at a specific temperature, and these be balanced.

Accordingly, in molding by heating with steam at a saturation steam pressure of 0.18 MPa (G), polypropylene resin foamed beads giving foamed bead molded article that is superior in secondary foaming property and fusion property and excellent in heat resistance and external appearance can be obtained by optimizing the plurality of predominant factors described above.

Polypropylene resin foamed beads conferred with molding processability at low heating temperature by optimizing the predominant factors described above were successfully obtained, but the physical properties such as compression strength characteristics of the conventional propylene resin foamed bead molded article were sometimes not maintained. The present inventors solved the problem of physical properties such as compression strength etc. by using a base resin having an Olsen flexural modulus of 500 MPa or more, even if the melting point is 135° C. or less.

That is, the polypropylene resin foamed beads of the present invention comprise a polypropylene resin having a melting point of 115 to 135° C. and an Olsen flexural modulus of 500 MPa or more, wherein the amount of ash on the surfaces of the foamed beads is 3,000 ppm by weight or less (including 0), the foamed beads show one or more endothermic peaks (Pa) having a peak temperature (i.e. apex temperature) in a temperature region not higher than the melting point of the resin and one or more endothermic peaks (Pb) having a peak temperature (i.e. apex temperature) in a temperature region exceeding the melting point of the resin and not lower than 130° C., in a first DSC curve obtained by a differential scanning calorimeter of the foamed bead, particularly in a first DSC curve obtained by heating 1 to 3 mg of polypropylene resin foamed beads when heated from room temperature to 200° C. at a temperature elevation rate of 10° C./min with a heat flux differential scanning calorimeter, and the total calorie of the endothermic peak (Pb) is in the range of 2 to 12 J/g.

The polypropylene resin used in the present invention refers to a propylene polymer having a weight-average molecular weight of 10000 or more polymerized from propylene monomers as main raw materials. The base resin of foamed beads may be a crosslinked polypropylene resin or a non-crosslinked polypropylene resin, preferably a non-crosslinked propylene resin, and may be a propylene homopolymer, a propylene block copolymer or a propylene random copolymer as long as it has a melting point of 115 to 135° C. and an Olsen flexural modulus of 500 MPa or more. For obtaining a polypropylene resin having a melting point of 115 to 135° C., a propylene random copolymer is preferable. The propylene random copolymer consists of a copolymer of a propylene and an ethylene and/or an α-olefin having 4 to 20 carbon atoms, and the copolymerization comonomer with propylene is exemplified specifically by ethylene, 1-butene, 1-pentene, 1-hexene, 1-octene, and 4-methyl-1-butene. The propylene random copolymer may be a binary copolymer such as a propylene-ethylene random copolymer, a propylene-butene random copolymer, or a ternary copolymer such as a propylene-ethylene-butene random copolymer. The ratio of comonomer components other than propylene in the copolymer is not particularly limited and is in such a range that the polypropylene resin after polymerization is handled as a crystalline resin forming substantial crystals.

The polymerization catalyst used in polymerizing the polypropylene resin used in the present invention is not particularly limited, and an organometal complex having performance as a polymerization catalyst can be used. Use can be made of polymerization catalysts generally called Ziegler-Natta catalysts that are organometallic complexes modified partially or wholly with an alkyl group having a nuclear element such as titanium, aluminum or magnesium, organometallic simple complexes called metallocene or homogeneous catalysts that are modified with a cyclopentane ring having, a nuclear element, boron or a transition metal such as zirconium, titanium, thorium, ruthenium, lanthanum or iron, or combinations of the organometallic complex and methyl alumoxan. For obtaining polypropylene resins having a high Olsen flexural modulus and a low melting point, metallocene catalysts are preferable, and among the metallocene catalysts, those composed of complexes having a silylene crosslinked azurenyl ligand are particularly preferable.

The polypropylene resin which among the polypropylene resins used in the present invention, is polymerized with a metallocene catalyst can also uses as a base resin for producing foamed beads, a polypropylene resin in which a monomer hardly polymerized with the conventional Ziegler-Natta catalyst is used in copolymerization with propylene. Examples of such monomers can include, for example, one or more compounds selected from cyclic olefins such as cyclopentene, norbornene, 1,4,5,8-dimethano-1,2,3,4,4a,8,8a,6-octahydronaphthalene, nonconjugated dienes such as 5-methyl-1,4-hexadiene and 7-methyl-6-octadiene, and aromatic unsaturated compounds such as styrene and divinyl benzene.

The polypropylene copolymer in the present invention is a polypropylene resin containing 70% by mole or more, preferably 80 to 99% by mole, of a structural unit derived from propylene in the copolymer and 30% by mole or less, preferably 1 to 20% by mole, of a structural unit derived from an ethylene and/or an α-olefin having 4 to 20 carbon atoms. When the content of the structural unit derived from ethylene and/or an α-olefin having 4 to 20 carbon atoms in the copolymer is too high, the mechanical physical properties such as flexural strength and tensile strength of the base resin are significantly decreased, thus failing to provide a resin having an Olsen flexural modulus of 500 MPa or more, and thus foamed beads and a foamed bead molded article achieving the desired object cannot be obtained.

Not higher than 50 parts by weight of resins different in melting point or different in monomer components, whether they are crystal or amorphous, may be added to 100 parts by weight not only of a polypropylene resin polymerized with the metallocene catalyst but also of the polypropylene resin used in the present invention. The resin that can be added includes a propylene homopolymer, a random copolymer or a block copolymer having ethylene and/or α-olefins such as butene, hexene and octene copolymerized with propylene, and a homopolymer or a copolymer having a molecular weight of 1000 or more containing one or more monomers selected from the group consisting of styrene, ethylene, acrylic acid, methacrylic acid, acrylonitrile, butadiene, butene, 4-methyl-pentene-1, bisphenol A, ethylene glycol, propylene glycol, terephthalic acid and naphthalene.

As described above, the polypropylene resin used in the present invention is a single product or a composite composition and has a melting point of 115 to 135° C. and an Olsen flexural modulus of 500 MPa or more.

In the present invention, the melting point of the polypropylene resin is 135° C. or less, whereby the heating temperature in molding of the foamed beads can be decreased. The fact that the melting point is 115° C. or more, together with the condition of an Olsen flexural modulus of 500 MPa or more, etc., contributes to stabilization of curing conditions just after molding of foamed beads and to production of a foamed bead molded article having sufficient mechanical physical properties. The melting point is preferably 115° C. or more and less than 130° C. from the viewpoint of molding of the foamed beads at lower temperature or preferably 130 to 135° C. from the viewpoint of obtaining the foamed bead molded article having excellent mechanical physical properties.

The melting point of the polypropylene resin in the present invention is a value determined by a method described in JIS K7121-1987. "Method of determining melting temperature after regulation of the state of a test specimen" described in the JIS K7121-1987 is used as a detailed established condition for measuring the melting point.

In the DSC curve obtained by melting point measurement with a heat flux differential scanning calorimeter, one or more endothermic peaks appear due to crystal fusion. When one endothermic peak appears, the peak temperature of its endothermic peak is estimated as a melting point, while when two or more endothermic peaks appear, the calories of the respective endothermic peaks are determined by a partial area analysis method described later, and the peak temperature of the endothermic peak appearing at the highest temperature side among the endothermic peaks having an endothermic peak of 4 J/g or more is estimated as resin melting point Tm (see FIG. 1). As a test specimen for the resin melting point measurement, foamed beads or a foamed bead molded article specimen can be used besides the polypropylene resin.

Figure 2:
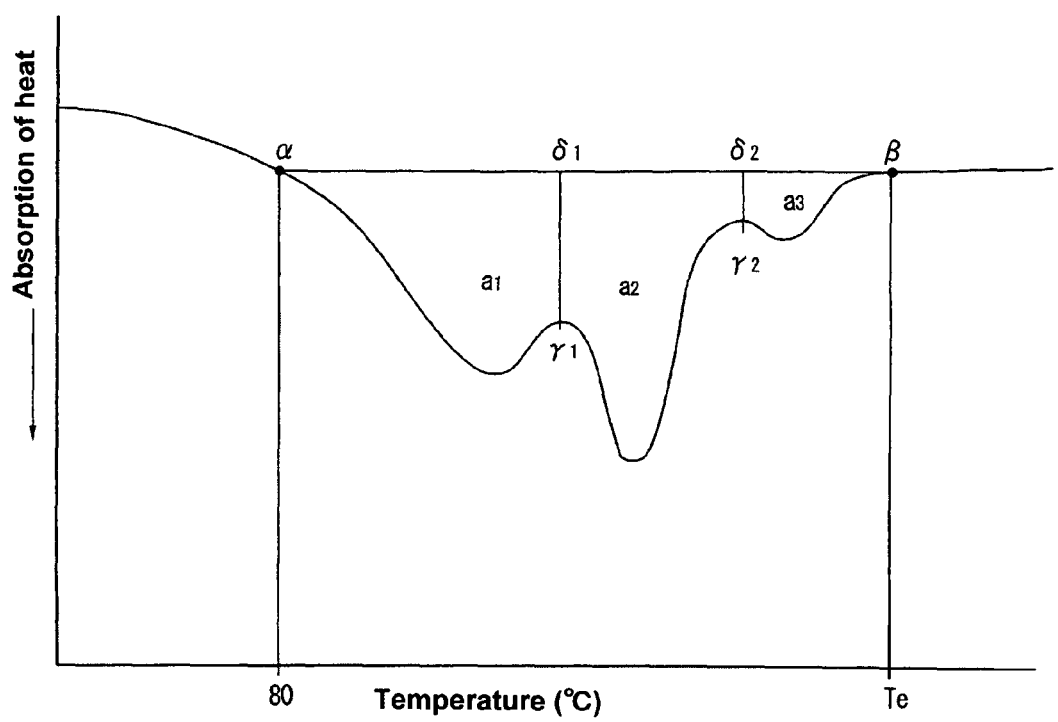
FIG. 2 is a diagram showing a partial area analysis method for obtaining calorie of each endothermic peak on a DSC curve.

The partial area analysis method will be described with reference to FIG. 2. The point α corresponding to 80° C. on the DSC curve obtained by the resin melting point measurement, and the point β on the DSC curve, corresponding to the fusion termination temperature Te of the resin, are connected to form a linear line (α–β). Then, the point $\gamma_1$ on the valley on the DSC curve between the peak $a_1$ observed in the lowest temperature region on the DSC curve and the peak $a_2$ adjacent to the peak $a_1$ is connected to form a linear line parallel to a longitudinal axis of the graph, to determine $\delta_1$ as a point intersecting with the linear line (α–β). Further, the peak $a_3$ adjacent to the peak $a_2$ is observed, and thus the point $\gamma_2$ on the valley on the DSC curve between the peak $a_2$ and the peak $a_3$ is connected to form a linear line parallel to a longitudinal axis of the graph, to determine $\delta_2$ as a point intersecting with the linear line (α–β). Thereafter, when peaks $a_4$, peaks $a_5$, peaks $a_6$ . . . are observed, the same operation is repeated. By the above operation, the obtained line segment ($\delta_n$–$\gamma_n$) (n is an integer of 1 or more) becomes each peak border line for determining an endothermic peak area. Hence, in the area of each peak corresponding to the calorie of an endothermic peak, peak $a_1$ is an area enclosed by the DSC curve indicative of peak $a_1$, the line segment ($\delta_1$–$\gamma_1$) and the line segment (α–$\delta_1$), the peak $a_2$ is an area enclosed by the DSC curve indicative of the peak $a_2$, the line segment ($\delta_1$–$\gamma_1$), the line segment ($\delta_2$–$\gamma_2$) and the line segment ($\gamma_1$–$\delta_2$), and the peak $a_3$ is determined as an area enclosed by the DSC curve indicative of the peak $a_3$, the line segment ($\gamma_2$–$\gamma_2$) and the line segment ($\delta_2$–β). Thereafter, when peak $a_4$, peak $a_5$, peak $a_6$ . . . are also observed, the peak area can be determined in the same manner. The calorie of each peak is mechanically calculated with a heat flux differential scanning calorimeter on the basis of the area of each peak determined as described above. The reason that the point a on the DSC curve is a point corresponding to the temperature of 80° C. in the measurement method described above to draw the linear line (α–β) as a baseline is due to the inventors' finding wherein a baseline initiated at a point corresponding to 80° C. and terminated at a point corresponding to the fusion termination temperature is preferable in determining the calorie of an endothermic peak stably with good reproducibility.

In the present invention, the Olsen flexural modulus of the polypropylene resin is 500 MPa or more and can thereby exhibit mechanical strength equivalent to the conventional polypropylene resin foamed bead molded article. From the viewpoint of obtaining the foamed bead molded article having particularly excellent mechanical strength, the Olsen flexural modulus is preferably 600 MPa or more, more preferably 700 MPa or more, and its upper limit is approximately 2500 MPa.

Generally, the foamed bead molded article may shrink and deform just after molding because the inside of cells constituting the foamed bead molded article tends to be depressurized after forming with steam. Usually, for the purpose of drying condensation water derived from steam incorporated into foamed bead molded article and of permeation enhancement of air for returning the pressure in cell of the foamed bead molded article to atmospheric pressure, there is provided a step of heating and curing or post-curing to maintain the foamed bead molded article under condition of temperature at 60° C. or more and the atmospheric atmosphere conditions. This shrinkage and deformation of the foamed bead molded article occurs not only the steam forming pressure at molding for obtaining the foamed bead molded article is high but also at the steam heating at a saturation vapor pressure of 0.18 MPa (G) or less. Under such circumstances, when the Olsen flexural modulus is high relative to the steam forming pressure at the time of molding having positive correlation with the resin melting point of the base resin, the shrinkage deformation of just after forming due to rigidity of the resin tends to be small, and thus the effect of reduction of curing temperature and curing time can be achieved by using the polypropylene resin satisfying the relationship of the formula (2).

$$(\text{Olsen flexural modulus [MPa]}+1400)/15 \geqq \text{resin melting point [° C.]} \quad (2)$$

When the Olsen flexural modulus is extremely high as compared with the resin melting point, the fusion preceding foamed beads easily occur and are preferable, but the expansion ratio in production of the foamed beads is hardly improved, and the steam pressure necessary for secondary foaming tends to be extremely high as compared with steam pressure necessary for fusion of the foamed beads at the time of molding. Accordingly, when foamed beads having an expansion ratio of 15 times or more are to be obtained or when the molding property of the foamed beads is considered, the polypropylene resin satisfying the following formula (3) is preferably used.

$$(\text{Olsen flexural modulus [MPa]}+1750)/20 \leqq \text{resin melting point [° C.]} \quad (3)$$

Accordingly, from the viewpoint of reducing heating curing conditions and of improving molding property, the polypropylene resin satisfying the relationship of the formula (1) is preferably used.

$$(\text{Olsen flexural modulus [MPa]}+1400)/15 \geqq \text{resin melting point [° C.]} \geqq (\text{Olsen flexural modulus [MPa]}+1750)/20 \quad (1)$$

The Olsen flexural modulus of the polypropylene resin of the present invention is a flexural modulus determined on the basis of JIS K7106-1995. A test specimen used in the above measurement is a plate punched out with dimensions of 80 mm in length, 15 mm in width and 2.0 mm in thickness as described in JIS K7106-1995 from a plate produced by hot press from a polypropylene resin raw material. When the foamed beads or the foamed bead molded article are formed into a test specimen, the sample is defoamed sufficiently by hot press several times, cut to be diced, and then formed into test specimen as described above. In the test conditions in the above measurement, the bending moment is 6 kg·cm, and the support distance is 30 mm.

The important properties of the polypropylene resin that is a base resin of foamed beads are the resin melting point and Olsen flexural modulus as described above, and when the polypropylene resin using a base resin having a high melt flow rate (hereinafter, referred to as MFR) is used, an effect of reducing the steam pressure necessary for secondary foaming of foamed beads in molding of foamed beads is recognized, and thus the MFR value is preferably 5 (g/10 min) or more, more preferably 10 (g/10 min) or more. On the other hand, when the MFR value is too high, the resulting foamed bead molded article may become brittle, and thus the MFR value is preferably 60 (g/10 min) or less, preferably 40 (g/10 min) or less. The melt flow rate is a value measured under test conditions M (temperature 230° C., load 2.16 kg) in JIS K7210-1999.

The amount of ash on the surface of the polypropylene resin foamed beads of the present invention should be 3000 ppm by weight or less relative to the weight of the foamed beads. The amount is preferably 2000 ppm by weight or less, still more preferably 1000 ppm by weight or less. The amount is theoretically most preferably 0 ppm, but when 0 ppm is obtained, the surface of the foamed bead should be sufficiently washed, and realistically such washing is difficult in manufacturing. In manufacturing, it is difficult to prevent foreign substances from adsorbing or adhering to foamed beads in air or a dispersing medium, and use of a dispersing medium is inevitable, and thus the amount of ash is preferably substantially as low as possible, and the amount of ash is suitably regulated in the range described above.

The ash in the present invention means a combustion residual substance detected in a combustion residual test of foamed beads described below on a melting pot. The ash on the surfaces of the foamed beads is a substance derived from an inorganic matter adhering to the surfaces of the foamed beads. Accordingly, the ash is considered as a derivative of the dispersant used in production of foamed beads, and is considered as a combustion derivative of an alumina silica complex salt such as kaolin or as tricalcium phosphate. The amount of the ash on the surfaces of foamed beads is a value obtained as the amount of the combustion residual substance in the combustion residual test of the foamed beads described later in a melting pot and is correlated to be positive with the amount of the inorganic matter adhering to the surfaces of the foamed beads.

When the amount of the ash is 3000 ppm by weight or more, the amount of the inorganic matter adhering to the surfaces of the foamed beads is so large that a large amount of inorganic matter prevents foamed beads from being fused in molding of the foamed beads by heating with steam at the objective saturation vapor pressure of 0.18 MPa (G) or less, and thus even if the fusion preceding foamed beads are used in molding, an excellent foamed bead molded article cannot be obtained.

The method wherein the amount of the ash is reduced to 3000 ppm by weight or less is correlated to a dispersant introduced together with the resin particles into a dispersing medium during production of the foamed beads. As the method of producing the polypropylene resin foamed beads, a method of obtaining foamed beads by heating the polypropylene resin particles, plasticizing the particles by impregnating them with a foaming agent, and releasing the resin particles in a plasticized state from a closed container to a low-pressure atmosphere to give foamed beads is generally known. Then, it is the dispersant that plays the role of maintaining the resin particles in a plasticized state in the closed container, releasing and foaming the resin particles in a low-pressure atmosphere, and preventing mutual adhesion between the resin particles or foamed beads in these states.

For example, when an inorganic gas is used as a foaming agent, the foamed beads of the present invention are prepared at a foaming temperature of approximately 120 to 140° C., for convenience of production of the foamed beads with polypropylene resin particles having a melting point of 115 to 135° C. as a raw material. On the other hand, the desired object of the present invention is that when the foamed bead molded article is obtained from foamed beads obtained from polypropylene resin particles having a melting point of 115 to 135° C. by molding, the molding at the heating forming temperature at a steam pressure at approximately 130° C. or less, that is, by heating with steam at a saturation vapor pressure of 0.18 MPa (G) or less is possible. Accordingly, the foamed beads used should be fusion preceding foamed beads. However, the fusion preceding foamed beads easily cause mutual adhesion of the particles, and under such conditions, the amount of the dispersant added to the dispersing medium at the time of production of the foamed beads should be twice or more than usual in order to prevent the mutual adhesion of the particles. The amount of the inorganic matter adhering to the surface of the foamed beads obtained with a larger amount of the dispersant is higher than 3000 ppm by weight when the amount of the ash is measured.

However, a surfactant together with a dispersant is added to a dispersion medium, the ratio of the surfactant to the dispersant is regulated, the resin particles are released in a low-pressure atmosphere, and the atmosphere temperature for obtaining the foamed beads is regulated at 100° C. or less and made not higher than the crystallization temperature of the resin, whereby the amount of the dispersant added can be reduced, and the amount of ash on the surfaces of polypropylene resin foamed beads can be regulated to be 3000 ppm by weight or less. Specifically, the amount of the dispersant added to the dispersion medium in production of the foamed beads is preferably 20 or more, more preferably 300 or more, in terms of the weight ratio determined as the weight of the resin particles/weight of the dispersant. The upper limit of the weight ratio is approximately 1000. The ratio of the dispersant to the surfactant is preferably 45 or less, more preferably 30 or less, in terms of the weight ratio as determined as the weight of the dispersant/weight of the surfactant. The lower limit of the weight ratio is approximately 1.5.

The dispersant includes aluminum oxide, titanium oxide, aluminum hydroxide, tribasic calcium phosphate, magnesium pyrophosphate, zinc oxide, kaolin, talc, and mica. The surfactant includes anionic surfactants such as sodium dodecylbenzenesulfonate and sodium oleate.

The foamed beads of the present invention are not limited to the foamed beads obtained by the method of using a dispersant and a surfactant at a specific ratio, and the amount of ash on the surfaces of the final foamed beads may be 3000 ppm by weight or less. For example, foamed beads are produced by a method wherein the amount of the dispersant added is increased and preventing mutual adhesion of the resin particles and foamed beads, and even if the amount of ash on the surfaces of the foamed beads is higher than 3000 ppm by weight, the surfaces of the foamed beads are washed in a later step thereby removing a large amount of adhering inorganic matter, whereby foamed beads wherein the amount of ash on the surfaces of the foamed beads is 3000 ppm by weight or less can be obtained.

The amount of the inorganic matter adhering to the surfaces of foamed beads in the present invention can be determined to be high or low by quantifying the amount of ash in a combustion residue test of foamed beads in a crucible. In the combustion residue test for quantifying the ash, the amount of combustion residues derived from inorganic matter adhering to the surfaces of the foamed beads should be distinguished from the combustion residues of the whole foamed beads containing combustion residues derived from inorganic matter kneaded in foamed beads and the amount of combustion residues derived from inorganic matter adhering to the surfaces of the foamed beads by a procedure described below. First, in the combustion residue test, a crucible having a constant weight is precisely weighed, foamed beads which are precisely weighed are placed in the crucible, placed in a heating furnace and kept at a furnace temperature of 950° C. for 15 minutes, thereby removing an organic matter including a polypropylene resin by combustion or thermolysis, and the combustion residue becoming a constant weight is obtained, the weight of the melting pot containing the combustion residue having a constant weight is precisely weighed, and from its difference from the weight of the previously constant weighed crucible, the weight of the combustion residue is determined.

Then, the parts per million (A) ppm by weight of the weight of the combustion residue based on the weight of the foamed beads placed in the crucible is calculated. As the combustion residue, the inorganic matter remaining in the crucible is the combustion residues as the whole foamed beads containing combustion residues derived from inorganic matter kneaded in foamed beads and combustion residues derived from inorganic matter adhering to the surfaces of the foamed beads. To determine the amount of the combustion residue derived from the inorganic matter adhering to the surfaces of the foamed beads, the weight of the combustion residue derived from the inorganic matter kneaded in the foamed beads should be subtracted from the weight of the combustion residue of the whole foamed beads. Accordingly, foamed beads prepared from the same foamed bead group as the previously used foamed beads are prepared, and the surfaces of the foamed beads are scraped off to give only foam layers inside the foamed beads, and then the precisely weighed foam layers inside the foamed beads are placed in a crucible and subjected to the same procedure as in the combustion residue test described above, to determine the weight of the combustion residue derived from the inorganic matter kneaded in the foamed beads. Then, the parts per million (B) ppm by weight of the weight of the combustion residue based on the weight of the foam layers inside the foamed beads placed in the crucible is calculated. The amount of ash on the surfaces of the foamed beads can be determined by subtracting the weight (B) (ppm) from the weight (A) (ppm) determined in this manner. The method of scraping off the surfaces of the foamed beads to obtain the foam layers inside the foamed beads is an operation of cutting all the surfaces of the foamed beads using a cutter knife or the like, and the thickness of the surface cut shall be approximately 200 μm.

In the foamed beads of the present invention, the ratio of expansion before and after heating with steam at a saturation vapor pressure of 0.15 MPa (G) serves as an indicator showing whether the requirement of secondary foaming property as one necessary condition to enable forming at low molding temperature is satisfied. Specifically, the ratio of expansion is preferably 1.5 or more in order that sufficient secondary foaming property is exhibited with molding by heating with steam at a saturation vapor pressure of 0.18 MPa (G). The value of expansion ratio is a value obtained by dividing 900 g/L standard density of the polypropylene resin by the apparent density (g/L) of the foamed beads.

The foamed beads of the present invention, as described in the fusion preceding foamed beads and the secondary foaming preceding foamed beads, should be regulated to control the secondary foaming property of the foamed beads and also to adjust the fusion of the foamed beads to timing for manifestation of the secondary foaming property of the foamed beads to realize molding of the foamed beads by heating with steam at low saturation vapor pressure. Accordingly, the ratio of expansion of the foamed beads before and after heating with steam at a saturation vapor pressure of 0.15 MPa (G) is preferably 1.5 or more.

In this specification, the ratio of expansion of the foamed beads before and after heating with steam at a saturation vapor pressure of 0.15 MPa (G) is determined by dividing the expansion ratio of the foamed beads after heating with steam at a saturation vapor pressure of 0.15 MPa (G), by the expansion ratio of the foamed beads actually used in measurement, and the expansion ratio of the foamed beads after heating can be determined in the following manner. In measurement of the expansion ratio of the foamed beads after heating with steam at a saturation vapor pressure of 0.15 MPa (G), 10 g of the foamed beads are placed in a 3 to 5 L closed container such as an autoclave, and steam at a saturation vapor pressure of 0.15 MPa (G) is introduced; this test is carried out plural times while the time of introduction of steam is changed, thereby measuring the apparent density of the obtained foamed beads obtained in each test, to obtain a curve graph showing the relationship between the apparent density of foamed beads and the time of introduction of steam. From the obtained curve on the graph, the minimum apparent density of the foamed beads is read out, and 900 g/L is divided by the minimum apparent density (g/L) of the foamed beads and thereby determined as the expansion ratio of the foamed beads after heating.

In order that the foamed beads can satisfy the ratio of expansion to be 1.5 or more before and after heating with steam at a saturation vapor pressure of 0.15 MPa (G), it is important that one or more endothermic peak (hereinafter referred to as high-temperature peak) having a peak temperature (i.e. apex temperature) higher than the melting point and in a temperature region not lower than 130° C. appears on a first DSC curve obtained by heat flux differential scanning calorimetry of the foamed bead, and the calorie of the high-temperature peak be 2 to 12 J/g. When two or more high-temperature peaks appear, the calories of the high-temperature peaks mean that the total calorie of total high-temperate peaks is 2 to 12 J/g. The high-temperature peak is derived from polypropylene resin crystals which out of the polypropylene resin crystals capable of occurring in the foamed beads, can be formed by the isothermal crystallization operation. When the calorie of the high-temperature peak is less than 2 J/g, shrinkage generated in the foamed bead molded article is hardly recovered even if curing at high temperature is performed after molding, and the compression strength, energy absorption efficiency etc. of the resulting foamed bead molded article are reduced. On the other hand, when the calorie in a high-temperature peak is higher than 12 J/g, secondary foaming property may become insufficient during molding by heating with steam at a saturation vapor pressure of 0.18 MPa (G) or less. The calorie in a high-temperature peak in the present invention is preferably 4 to 11 J/g, more preferably 5 to 10 J/g, from the viewpoint described above.

The foamed beads of the present invention in the first DSC curve have the high-temperature peak, and simultaneously there appears one or more endothermic peak having a peak temperature (i.e. apex temperature) in a temperature region not higher than the melting point. The endothermic peak appearing in a temperature region not higher than the melting point is derived from crystals showing the melting point of the polypropylene resin that is a base resin, and among endothermic peaks, the peak temperature of the largest peak area agrees approximately with the melting point of the base resin and thus serves as an indicator of the melting point of the base resin.

The total calorie (for example, the calorie corresponding to the area of peak Pa represented by a white portion in FIG. 3) of one or more endothermic peaks (hereinafter, referred to as inherent peaks) having a peak temperature (i.e. apex temperature) in a temperature region not higher than the melting point measured in the same manner as in measuring the high-temperature peak calorie is preferably 30 to 80 J/g, more preferably 40 to 70 J/g, from the viewpoint of mutual excellent fusion among the foamed beads in molding.

The method of regulating the calorie in a high-temperature peak in the range described above in the present invention is preferably a regulation method using isothermal crystallization during production of foamed beads, from the viewpoint of obtaining a foamed bead molded article having stable mechanical physical properties. As a method other than the isothermal crystallization operation, there is a method of mixing a polypropylene resin having a melting point of higher than 135° C. with a polypropylene resin having a melting point of 135° C. or less as a polypropylene resin. As a matter of course, the melting point of the polypropylene resin after being mixed should be 115 to 135° C.

The method of measuring the calorie in a high-temperature peak of the foamed beads in the present invention is as follows: In a DSC curve obtained by heating 1 to 3 mg of the foamed beads from room temperature (approximately 25° C.) to 200° C. at a rate of 10° C./min with a heat flux differential scanning calorimeter, an endothermic peak (hereinafter, referred to as inherent peak) Pa derived from crystals showing the resin melting point of the polypropylene resin as a base resin and having a peak temperature (i.e. apex temperature) PTma in a temperature region not higher than the resin melting point appears, and when one or more endothermic peak Pb being higher than the resin melting point and having a peak temperature PTmb in a temperature region not lower than 130° C. appears, then the endothermic peak Pb is a high-temperature peak in the present invention, and the calorie of the high-temperature peak of the foamed beads corresponds to the area of the endothermic peak Pb. Accordingly, the calorie of the high-temperature peak is calculated mechanically by determining the area of the endothermic peak Pb with a differential scanning calorimeter. The area of the endothermic peak Pb can be determined by the following method.

Figure 3:
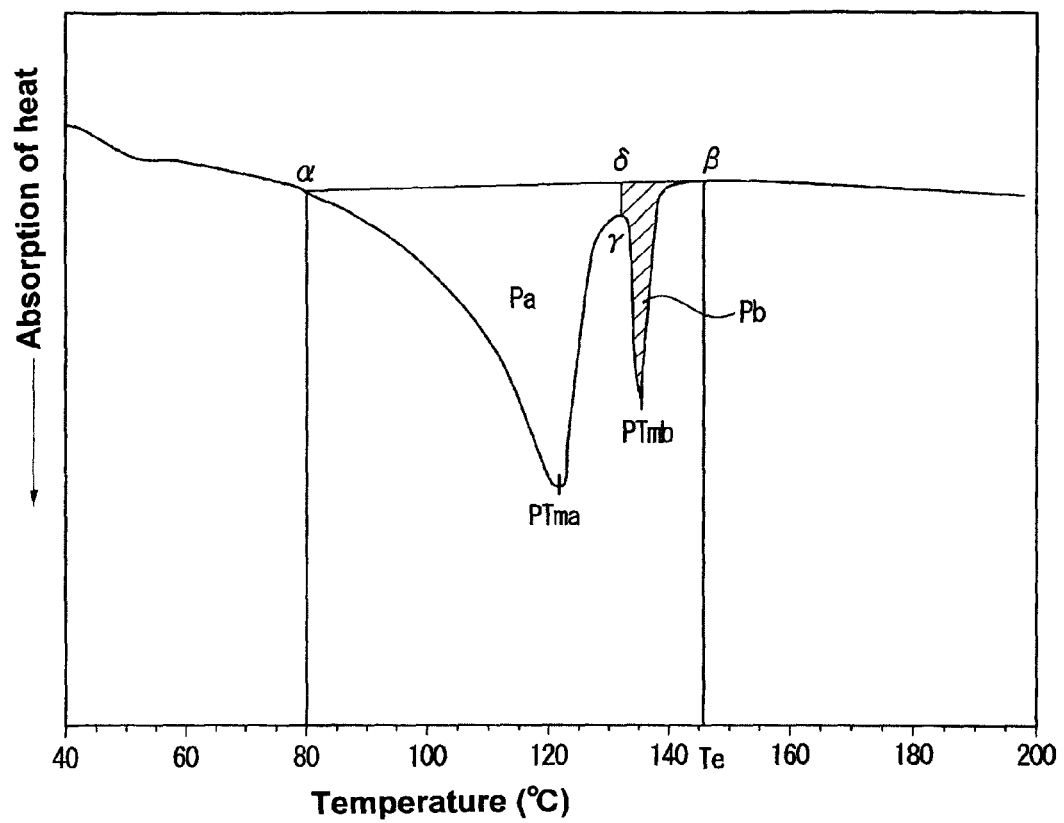
FIG. 3 is a diagram showing a first DSC curve of the foamed beads of the present invention.

For example, as shown in FIG. 3, the point α a corresponding to 80° C. on the DSC curve, and the point β on the DSC curve corresponding to the melting termination temperature Te of the foamed beads, are connected to form a linear line (α–β). Then, the point γ on the valley of the DSC curve, between the inherent peak Pa and the high-temperature peak Pb, is connected to form a linear line parallel to a longitudinal axis of the graph, to determine δ as a point intersecting with the linear line (α–β). The area of the high-temperature peak Pb is determined as the area of the region (shaded portion in FIG. 3) enclosed by the DSC curve showing the high-temperature peak Pb in the DSC curve, the line segment (δ–β) and the line segment (γ–δ).

The high-temperature peak Pb obtained by the regulation method using the isothermal crystallization in the present invention appears in a first DSC curve of the foamed beads measured as described above, but does not appear in a second DSC curve obtained by decreasing the temperature from 200° C. to once about 40° C. at a rate of 10° C./min and then increasing the temperature to 200° C. again at a rate of 10° C./min, after obtaining the first DSC curve, and in the second DSC curve, only an endothermic peak derived from crystals showing the melting point of the base resin similar to the inherent peak Pa appears, and thus the inherent peak Pa and the high-temperature peak Pb can be easily distinguished form each other.

The reason that the point α on the DSC curve is a point corresponding to the temperature of 80° C. in the measurement method described above to draw the linear line (α–β) as a baseline is that a baseline initiated at a point corresponding to 80° C. and terminated at a point corresponding to the fusion termination temperature is preferable in determining the calorie of an high-temperature peak stably with good reproducibility.

The average cell diameter of the foamed beads of the present invention is usually 30 to 500 μm, more preferably 50 to 350 μm. From the relationship of the strength of the cell film, the foamed bead having an average cell diameter in the range described above shows excellent foaming property during the secondary foaming or molding of the foamed beads described later without defoaming the cell of the foamed beads.

The average cell diameter of the foamed beads can be determined on the basis of an enlarged photomicrograph having an approximately two divided cell section of foamed beads by the following operation. In the enlarged photograph of the cell section, 4 linear lines passing on the surface of the foamed beads to other surface and through the central parts of the cell section are drawn in 8 directions from the central parts to the surface of the foamed bead. Then, the total number (N) of cells intersecting with the 4 linear lines is determined. Then, the sum total length L (μm) of line segments from the surface of foamed beads of each of the 4 linear lines to the other surface is divided by the total number (N) of foamed beads, to determine (L/N) thereby calculating the average cell diameter of the foamed beads.

The average cell diameter increases depending on the high MFR of base resin, an increase in foaming temperature, a decrease in a foaming agent and a reduction in a cell adjusting agent, and thus the foamed beads having the objective average cell diameter can be obtained by suitably regulating these factors of change in average cell diameter.

As the average weight of one foamed bead is decreased, molding can be performed advantageously with low heating temperature, but when the average weight of one foamed bead is too low, foaming efficiency is deteriorated. Accordingly, the average weight of one foamed bead is preferably 0.01 to 10.0 mg, more preferably 0.1 to 5.0 mg. The average weight of the foamed beads is regulated by adjusting the average weight of one resin particle for obtaining the foamed beads to the average weight of one particle of the intended foamed bead.

The average weight of one resin particle can be regulated by a conventionally known pelletizing method such as a method wherein the base resin and other components and additives are melt-kneaded in an extruder and then the kneaded product is extruded into a string via a mouth ring having a small hole at the end of the extruder, and the string is cut into resin particles having a desired size or weight by a cutting machine having a taker.

The foamed beads of the present invention usually have an apparent density of 10 g/L or more and 500 g/L or less. The upper limit of the apparent density of the foamed beads of the present invention is preferably 300 g/L, more preferably 180 g/L, from the viewpoint of improving the fundamental characteristics of the foam such as lightweight properties and shock-absorbing characterizes. On the other hand, when the apparent density of the foamed beads is too low, the foam is easily broken, and thus the lower limit of the apparent density is preferably 12 g/L, more preferably 15 g/L.

The apparent density of the foamed beads in the present invention is a value obtained by sinking the foamed bead group with weight W (g) in a water-containing measuring cylinder using a metal mesh, then reading the volume V (L) of the foamed bead group from raising of water level, and dividing the weight of the foamed bead group by the volume of the foamed bead group (W/V).

In production of the foamed beads of the present invention, for example, a known foaming method can be used wherein propylene resin particles are dispersed together with a foaming agent in a dispersion medium such as water in a closed container, then heated thereby softening the resin particles, simultaneously the resin particles are impregnated with a foaming agent, and the resin particles are released from the container into a low-pressure region (usually into an atmospheric pressure region) at a temperature not lower than the softening temperature of the resin particles (see JP-B 49-2183, JP-B 56-1344 and JP-B 62-61227).

Preferably, when the content in a closed container is released from the closed container to a low-pressure region to obtain foamed beads, the closed container is back-pressured with the foaming agent used or an inorganic gas such as nitrogen to prevent the pressure in the container from rapidly decreasing, so that the content can be released and the apparent density of the resulting foamed beads can be unified.

The method of regulating the average cell diameter of the foamed beads is carried out mainly by incorporating 0.01 to 5 parts by weight of inorganic matter such as talc, aluminum hydroxide, silica, zeolite, borax, and inorganic powder, as a cell adjusting agent, into 100 parts by weight of the base resin to give resin particles granulated to obtain the foamed beads with the base resin, but the average cell diameter changes due to foaming temperature, the type of the foaming agent and the amount used during the production of the foamed beads, and thus preliminary experiments should be previously conducted for establishing conditions before the objective particle having an average cell diameter is obtained.

The foamed beads having a high-temperature peak in the present invention can be obtained by a forming method, wherein the resin particles when heated with dispersion in a dispersing medium in a closed container, the foamed beads are not heated above a melting termination temperature of the resin particles (hereinafter, also referred to as Te) and are kept at an optional temperature Ta within a range from a temperature 15° C. below the melting point of the resin particles (hereinafter, also referred to as Tm) to a temperature lower than Te for a sufficient time, preferably for 10 to 60 minutes and then regulated at the optional temperature Tb in the range of (Tm−5° C.) to (Te+5°). The resin particles are released from the container to a low pressure region at the temperature and thereby expanded. For forming the high-temperature peak, a temperature kept between (Tm−15° C.) and Te can be established in multistage in the temperature range, or the high-temperature peak can be formed by heating at a slow speed over a sufficiently long time in the temperature range.

Formation of the high-temperature peak of foamed beads, and the degree of calorie of high-temperature peak, depend mainly on the temperature Ta and the retention time at temperature Ta for the resin particles in producing the foamed beads and the rate of temperature rise in the range of (Tm−15° C.) to (Te+5° C.). The calorie of the high-temperature peak of the foamed beads tends to be high when the temperature Ta or Tb is lower in each of the temperature ranges, when the retention time is longer in the range of (Tm−15° C.) to Te, and when the rate of temperature rise is lower in the range of (Tm−15° C.) to Te. The rate of temperature rise used is usually 0.5 to 5° C./min.

The calorie of the high-temperature peak tends to be low when the temperature Ta or Tb is higher in each of the temperature ranges, when the retention time is shorter in the range of (Tm−15° C.) to Te, when the rate of temperature rise is higher in the range of (Tm−15° C.) to Te, and when the rate of temperature rise is lower in the range of Te to (Te+5° C.). When preliminary experiments are carried out repeatedly in consideration of these features, production conditions of foamed beads showing the desired high-temperature peak calorie can be obtained.

The temperature range according to the formation of high-temperature peak is a suitable temperature range when the inorganic physical foaming agent is used as a foaming agent. Accordingly, when the foaming agent is changed to an organic physical foaming agent, the suitable temperature range is shifted toward a temperature lower by about 0 to 30° C. than the temperature range described above, depending on the type and used amount.

As the foaming agent used in producing the foamed beads of the present invention, organic physical foaming agents, inorganic physical foaming agents or mixtures thereof can be used. Organic physical foaming agents include aliphatic hydrocarbons such as propane, butane, hexane and heptane, alicyclic hydrocarbons such as cyclobutane and cyclohexane, halogenated hydrocarbons such as methyl chloride, ethyl chloride and methylene chloride, and dialkyl ethers such as dimethyl ether, diethyl ether and methyl ethyl ether, and these may be used as a mixture of two or more thereof.

An inorganic physical foaming agent includes nitrogen, carbon dioxide, argon, air, water etc., and these may be used as a mixture of two or more thereof. When the foamed beads are obtained using water as a dispersion medium together with the resin particles in the closed container, the resin particles may be kneaded with a water-absorbing resin so that water that is a dispersion medium can be used efficiently as a foaming agent. When an organic physical foaming agent and an inorganic physical foaming agent are used in combination, the organic physical foaming agent and the inorganic physical foaming agent can be arbitrarily selectively combined. When the organic physical foaming agent and the inorganic physical foaming agent are combined, the inorganic physical foaming agent is contained preferably in an amount of at least 30% by weight or more. Among the foaming agents, the inorganic physical foaming agent is preferable from the viewpoint of less destruction of the ozone layer and low cost, and particularly nitrogen, air, carbon dioxide and water are preferable.

The amount of the foaming agent used is determined in consideration of the apparent density of the foaming particles to be obtained, the type of the base resin, or the type of the foaming agent, etc., but usually the organic physical foaming agent is used in an amount of 5 to 50 parts by weight, or the inorganic physical foaming agent is used in an amount of 0.5 to 30 parts by weight, per 100 parts by weight of the resin particles.

The dispersing medium for dispersing the resin particles in producing foamed beads is not limited to water described above, and any solvent that undissolves the resin particles may be used. Examples of the dispersing medium other than water include ethylene glycol, glycerin, methanol and ethanol, but usually water is used. When the resin particles are dispersed in the dispersing medium, a dispersant may be added if necessary to the dispersing medium. The dispersant includes finely divided aluminum oxide, titanium oxide, basic magnesium carbonate, basic zinc carbonate, calcium carbonate, kaolin, mica, clay etc. The dispersant is used usually in an amount of 0.2 to 2 parts by weight per 100 parts by weight of the resin particles.

The resin particles are those composed of a polypropylene resin as described above, and as long as the desired effect of the invention is not deteriorated, it is possible to incorporate other polypropylene resins (for example propylene resins having a melting point of higher than 135° C.), for example, ethylene resins such as high-density polyethylene, moderate-density polyethylene, low-density polyethylene, linear low-density polyethylene, linear super low-density polyethylene, ethylene-vinyl acetate copolymer, ethylene-acrylic acid copolymer, ethylene-methacrylic acid copolymer, or resins such as polystyrene resins such as polystyrene and styrene-maleic anhydride copolymer.

Besides the resins described above, it is possible to add ethylene-propylene rubber, ethylene-1-butene rubber, propylene-1-butene rubber, styrene-butadiene rubber and hydrogenated products thereof, isoprene rubber, neoprene rubber, nitrile rubber, or elastomers such as styrene-butadiene block copolymer elastomers, hydrogenated products thereof, and the like. When resins or elastomers other than the polypropylene resins are incorporated into polypropylene resins, the total addition amount of the resins or elastomers other than the polypropylene resins is preferably 50% by weight or less, more preferably 30% by weight or less, more preferably 10% by weight or less, based on 100 parts by weight of the polypropylene resin.

Various types of additives may be further added to the resin particles. Examples of the additives include an antioxidant, a UV absorber, an antistatic agent, a conductive agent, a flame retardant, a metal inactivating agent, a pigment, a dye, a crystal nucleating agent, inorganic filling material and the like. These additives are preferably added in amounts of 25 parts by weight or less per 100 parts by weight of the resin particles, more preferably 20 parts by weight or less, even more preferably 5 parts by weight or less.

The polypropylene resin foamed beads obtained by releasing from the close container to a low-pressure region by the method described above are subjected to a curing step in an atmospheric pressure usually conducted after releasing, and then placed in the closed container for pressurizing and pressurized with a pressurizing gas such as air at 0.01 to 1.00 MPa (G), and the pressure in the foamed beads is increased at 0.01 to 0.08 MPa (G), preferably at 0.10 to 0.70 MPa (G), and then the foamed beads are removed from the container and then can be heated with steam or hot air to become foamed beads having a lower apparent density (this step is referred to as 2-stage foaming).

The foamed bead molded article of the present invention can be produced if necessary by using a batch molding method wherein foamed beads are subjected to the same operation of increasing the pressure in the foamed beads as in the two-stage foaming described above so that the pressure in the foamed beads is regulated at 0.01 to 0.10 MPa (G), and then charged into a conventionally known thermoplastic resin foamed beads molding cavity capable of heating, cooling, opening, closing and sealing, the foamed beads are heated and expanded in the mold with steam at a saturation vapor pressure of 0.06 to 0.18 MPa (G), preferably 0.10 to 0.16 MPa (G), the foamed beads are thereby mutually fused to one another, and then the resulting foamed bead molded article is cooled and removed from the cavity (for example, a forming method described in JP-B 4-46217 and JP-B 6-49795). The method of heating with steam in the molding method can use a conventionally known method wherein one-side heating, reverse one-side heating, and main heating can be suitably combined, and the heating method is particularly preferably a method wherein the foamed beads are heated in preliminary heating, one-side heating, reverse one-side heating, and main heating in this order. The saturation vapor pressure of 0.06 to 0.18 MPa (G) during the molding of the foamed beads is the maximum value of the saturation vapor pressure of steam supplied to a mold during molding step.

The foamed bead molded article of the present invention can also be produced by a continuous molding method wherein the pressure in the foamed beads is regulated as necessary at 0.01 to 0.10 MPa (G) and then the foamed beads are fed continuously to the inside of a mold formed by belts which are continuously carried along the top and bottom of the passage having a heating region and cooling region and a steam at a saturation vapor pressure of 0.06 to 0.18 MPa (G) is fed to the inside of the mold when the foamed beads are passing through the steam heating region, thereby expanding and fusing the foamed beads among them and then passed through a cooling region and are cooled, and the obtained foamed bead molded article is removed from the passage and then cut in a suitable length (for example, a forming method described in JP-A 9-104026, JP-A 9-104027 and JP-A 10-180888).

In molding with the polypropylene resin foamed beads of the present invention, the surfaces of the foamed beads are considered to be fused first by heating with the steam and then the foamed beads can be secondarily foamed later thereby forming a foamed bead molded article excellent in appearance and mutual fusion of the foamed beads.

When the foamed bead molded article having an apparent density of 30 g/L or less is obtained, the molding of conventional polypropylene resin foamed beads hardly gives an excellent foamed bead molded article without using, depending on intended shape, either a method of molding with foamed beads having high pressure therein or a method of molding with an increased charged rate in a mold cavity charged with the foamed beads having an apparent density not higher than the apparent density of a intended foam molded article, but the propylene resin foamed beads of the present invention is characterized in that without such method, an excellent foamed bead molded article can be obtained.

The foamed bead molded article of the present invention thus produced has an interconnected cell ratio of preferably 40% or less, more preferably 30% or less, most preferably 25% or less, based on procedure C in ASTM-D2856-70. As the interconnected cell of a foamed bead molded article decreases, the foamed bead molded article is made more excellent in mechanical strength. The apparent density of the foamed bead molded article of the present invention is preferably 10 to 300 g/L, more preferably 13 to 180 g/L, from the viewpoint of mechanical strength, shock-absorbing characteristics and lightweight properties. The apparent density (g/L) of the foamed bead molded article can be determined by dividing the weight (g) of the foamed bead molded article by the volume (L) determined from the outside dimension of the foamed bead molded article.

EXAMPLES

Hereinafter, the examples of the present invention will be described.

Examples 1 to 10 and Comparative Examples 1 to 9

Base resins used in the Examples and Comparative Examples, and states thereof are shown in Table 1 below.

TABLE 1

| Base Resin | Catalyst Species | Type of Base Resin | Melting Point (° C.) | Comonomer Content (mol %) | MFR (g/10 min) | Olsen Flexural Modulus (MPa) |
|---|---|---|---|---|---|---|
| Resin 1 | Metallocene type | Propylene-ethylene random copolymer | 142 | Ethylene: 0.75 | 7 | 920 |
| Resin 2 | Ziegler type | Propylene-ethylene random copolymer | 145 | Ethylene: 2.8 | 10 | 800 |
| Resin 3 | Ziegler type | Propylene-ethylene random copolymer | 135 | Ethylene: 3.9 | 7 | 490 |
| Resin 4 | Metallocene type | Propylene-ethylene random copolymer | 125 | Ethylene: 4.3 | 7 | 610 |
| Resin 5 | Metallocene type | Propylene-ethylene random copolymer | 134 | Ethylene: 2.4 | 7 | 780 |
| Resin 6 | Metallocene type | Propylene-ethylene random copolymer | 109 | Ethylene: 7.9 | 4 | 460 |
| Resin 7 | Metallocene type | Propylene-ethylene random copolymer | 120 | Ethylene: 5.6 | 8 | 520 |
| Resin 8 | Metallocene type | Propylene-ethylene-butene-1 random copolymer | 120 | Ethylene: 1.3 Butene: 3.1 | 4 | 570 |
| Resin 9 | Ziegler type | Propylene-ethylene-butene-1 random copolymer | 129 | Ethylene: 4.7 Butene: 1.7 | 5 | 600 |

TABLE 1-continued

| Base Resin | Catalyst Species | Type of Base Resin | Melting Point (°C.) | Comonomer Content (mol %) | MFR (g/10 min) | Olsen Flexural Modulus (MPa) |
|---|---|---|---|---|---|---|
| Resin 10 | Metallocene type | Propylene-butene-1 random copolymer | 124 | Butene: 8.5 | 5 | 670 |
| Resin 11 | Metallocene type | Propylene-ethylene random copolymer | 128 | Ethylene: 3.7 | 25 | 660 |

A production example of the base resin in Table 1 above will be described below.
(Production Method of Resin 1)
[Synthesis of Transition Metal Compound]

The synthesis of [(r)-dichloro[1,1'-dimethylsilylenebis{2-methyl-4-(4-chlorophenyl)-4H-azulenyl}]zirconium] was carried out in accordance with the Examples in JP-A No. 10-226712.
[Chemical Treatment of Silicate]

3.75 L distilled water and then 2.5 kg (96%) of conc. sulfuric acid were added slowly to a 10-L glass separable flask equipped with a stirring blade. 1 kg of montmorillonite (Benclay S L manufactured by Mizusawa Industrial Chemicals, Ltd.; average particle size: 25 μm, particle size distribution: 10 μm to 60 μm) was dispersed at 50° C. and then heated to 90° C., and kept at the same temperature for 6.5 hours. After cooling to 50° C., a slurry was filtered under reduced pressure, to recover a cake. 7 L of distilled water was added to this cake which was then formed again into slurry followed by filtration. This washing procedure was carried out until the pH of the wash (filtrate) became higher than 3.5.

The recovered cake was dried in a nitrogen atmosphere at 110° C. overnight. The weight after drying was 707 g.
[Drying of Silicate]

The previously chemically treated silicate was dried with a kiln dryer. Specifications and drying conditions are as shown below. Rotating Tube: A cylinder, inner diameter 50 mm, heated zone 550 mm (electric furnace), equipped with stirring blade Number of Revolutions: 2 rpm, degree of inclination: 20/520, rate of feeding of silicate: 2.5 g/min, gas flow rate: nitrogen, 96 L/hour, counter current, dry temperature: 200° C. (powder temperature)
[Preparation of the Catalyst]

20 g of the dried silicate obtained as described above was introduced into a glass reactor having a volume of 1 L equipped with a stirring blade, and 116 mL of mixed heptane, and 84 mL (0.60 Mol) of triethyl aluminum in heptane solution, were added and stirred at room temperature. The mixture was stirred for 1 hour and then washed with mixed heptane, and the silicate slurry was prepared to 200 mL.

Then, 0.96 mL of triisobutyl aluminum in heptane solution (0.71 Mol/L) was added to the silicate slurry prepared as described above, and the mixture was reacted at 25° C. for 1 hour. Simultaneously, 3.31 mL of triisobutyl aluminum in heptane solution (0.71 Mol) was added to 218 mg (0.3 mmol) of [(r)-dichloro[1,1'-dimethylsilylenebis{2-methyl-4-(4-chlorophenyl)-4H-azurenyl}]zirconium], and 87 mL of mixed heptane, and the mixture was reacted at room temperature for 1 hour, added to the silicate slurry and stirred for 1 hour, and mixed heptane was further added thereto and prepared to 500 mL.
[Preliminary Polymerization/Washing]

Subsequently, the previously prepared silicate/metallocene complex slurry was introduced into a stirring autoclave having an internal volume of 1.0 L substituted sufficiently with nitrogen. When the temperature was stabilized at 40° C., propylene was fed at a rate of 10 g/hour and the temperature was maintained. After 4 hours, supply of propylene was terminated and this condition was kept for 2 hours.

After preliminary polymerization, the remaining monomer was purged, and the stirring was terminated and the system was left for about 10 minutes, and 240 mL of the supernatant was decanted. Then, 0.95 ml of triisobutyl aluminum (0.71 Mol/L) in heptane solution and 560 mL of mixed heptane were added, and the mixture was stirred at 40° C. for 30 minutes and left for 10 minutes, and 560 mL of the supernatant was removed. Then, this operation was further conducted 3 times. When the components in the final supernatant were analyzed, the concentration of the organic aluminum components indicated 1.23 mmol/L, a Zr concentration of $8.6 \times 10^{-6}$ g/L, and the material charged in the supernatant was 0.016%.

Then, 17.0 mL of triisobutyl aluminum (0.71 Mol/L) in heptane solution was added, and the mixture was dried under reduced pressure at 45° C. By this operation, a preliminary polymerization catalyst containing 2.0 g polypropylene per 1 g of the solid catalyst component was obtained.
[Polymerization]

A stirring autoclave having an internal volume of 200 L was sufficiently substituted with propylene, and then 45 kg of sufficiently dehydrated liquefied propylene was introduced. 500 mL (0.12 mol) of triisobutyl aluminum/n-heptane solution, 0.32 kg of ethylene, and 2.5 L (in terms of volume in standard state) of hydrogen were added, and the internal temperature was kept at 30° C. Then, 1.90 g (in terms of solid catalyst component) of a metallocene polymerization catalyst was pressed with argon into it to initiate polymerization, and then heated to 70° C. over 40 minutes, and the temperature was maintained for 60 minutes. 100 mL ethanol was added thereto to terminate the reaction. The remaining gas was purged, and 20.3 kg of a polypropylene polymer was obtained. This operation was repeated 5 times to give a base resin 1.

This resin had an MFR of 7 g/10 min, an ethylene content of 0.75 mol % and a melting point of 142° C.
(Production Method of Resin 2)
(Preparation of Catalyst)

A glass 2-L reactor flushed with nitrogen was charged with 0.4 g mol titanium tetrachloride (hereinafter, simply referred to as mol) and then heated for 35° C. This titanium tetrachloride was mixed with the following reaction solution, that is, a mixture of 60 mL n-hexane, 0.05 mol diethyl aluminum chloride (hereinafter, referred to as DEAC) and 0.12 mol diisoamyl ether at 25° C. for 1 minute, and then the reaction mixture (I) (diisoamyl ether/DEAC molar ratio; 24/1) reacted for 5 minutes was added dropwise at 35° C. for 30 minutes. The reaction mixture of the titanium tetrachloride was thereafter kept for 30 minutes at 35° C. and then heated to 75° C. and reacted for 1 hour. The reaction mixture gave solid precipitates. The mixture was cooled to room temperature (20° C.) and left, and separated into precipitates and a supernatant, and the supernatant was removed by inclination of the reactor. After the supernatant was removed, 400 mL of n-hexane was added to the precipitates and stirred and mixed for 10 minutes, and by decantation and inclination, the operation of removing the supernatant was conducted 4 times. After the treatment, the precipitate was evaporated into dryness under reduced pressure to remove n-hexane thereby giving 19 g of a solid product (II). Then, the whole amount of the solid product (II) was placed in a 2 L glass reactor, and 300 mL of n-hexane was added thereto, the mixture was stirred and suspended, 16 g diisoamyl ether and 35 g titanium tetrachloride were added at 20° C. and the mixture was reacted at 60° C. for 1 hour. This reaction mixture was cooled to room temperature and left to separate a precipitate (hereinafter referred to as second precipitate) and a supernatant was removed by inclination. Then, 400 mL n-hexane was added to the second precipitate after removing of supernatant and stirred and mixed for 10 minutes, then decanted to remove the supernatant; this step was conducted 4 times. Then, this solid product was dried under reduced pressure to give 15 g of titanium tetrachloride composition (hereinafter, referred to as Ziegler-Natta polymerization catalyst).

[Polymerization]

An autoclave made of stainless steel equipped with a stirrer having an internal volume of 500 L was sufficiently substituted with a propylene gas at room temperature, and 240 L of dehydrated and deoxidized n-hexane was introduced as a polymerization solvent. Then, 240 g of diethyl aluminum chloride, 320 L (in terms of volume in standard state) of hydrogen, and 15 g of the Ziegler-Natta polymerization catalyst were added under the condition of temperature at 45° C.

While the internal temperature of the autoclave was kept at 60° C., propylene was fed until the pressure became 1.0 MPa (G), and ethylene was fed at 0.37 kg/hr, to initiate the polymerization reaction. While ethylene was fed at a constant speed, propylene was fed at a pressure of 1.0 MPa, to polymerize the mixture for 240 minutes.

As a result, the total amounts of the fed monomers were 110 kg of propylene and 1.5 kg of ethylene.

While the autoclave was cooled to 25° C., the unreacted gas was released and the polymerization was terminated. The resulting slurry was transferred to a next chamber equipped with a stirring blade, and 50 L methanol was added, then the mixture was stirred at 55° C. for 30 minutes, 0.5 L of 20 wt % aqueous sodium hydroxide solution was added and stirred for 30 minutes, and 200 L of purified water was added and stirred for 1 hour, the aqueous layer was left and then separated, and the catalyst residue was removed. The slurry was treated with a centrifuge, hexane was removed, and the mixture was dried for 3 hours with a drying machine at 60° C., to give 61.0 kg of a propylene polymer (product). This operation was repeated twice, to give a base resin 2.

This resin had an MFR of 10 g/10 min, an ethylene content of 2.8 mol % and a melting point of 145° C.

(Production Method of Resin 3)

An autoclave made of stainless steel equipped with a stirrer having an internal volume of 500 L was sufficiently substituted with a propylene gas at room temperature, and 240 L of dehydrated and deoxidized n-hexane was introduced as a polymerization solvent. Then, 240 g of diethyl aluminum chloride, 320 L (in terms of volume in standard state) of hydrogen were added, and 15 g of a Ziegler-Natta polymerization catalyst prepared by the method described in the production method of the resin 2 were added under the condition of temperature at 45° C.

While the internal temperature of the autoclave was kept at 60° C., propylene was fed until the pressure became 1.0 MPa (G), and ethylene was fed at 0.63 kg/hr, to initiate the polymerization reaction. While ethylene was fed at a constant speed, propylene was fed at a pressure of 1.0 MPa, to polymerize the mixture for 210 minutes.

As a result, the total amounts of the fed monomers were 110 kg of propylene and 2.2 kg of ethylene.

While the autoclave was cooled to 25° C., the unreacted gas was released and the polymerization was terminated. The resulting slurry was transferred to a next chamber equipped with a stirring blade, and 50 L methanol was added, then the mixture was stirred at 55° C. for 30 minutes, 0.5 L of 20 wt % aqueous sodium hydroxide solution was added and stirred for 30 minutes, and 200 L of purified water was added and stirred for 1 hour, the aqueous layer was left and separated, and the catalyst residue was removed. The slurry was treated with a centrifuge, hexane was removed, and the mixture was dried for 3 hours with a drying machine at 60° C., to give 60.5 kg of a propylene polymer (product). This operation was repeated twice, to give a base resin 3.

This resin had an MFR of 7 g/10 min, an ethylene content of 3.9 mol % and a melting point of 135° C.

(Production Method of Resin 4)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 1.7 kg of ethylene, and 4.5 L (in terms of volume in standard state) of hydrogen were added thereto, and the internal temperature was kept at 30° C. Then, 0.75 g (in terms of solid catalyst component) of a metallocene polymerization catalyst prepared by the method described in the production method of the resin 1 was pressed with argon into it to initiate polymerization, and heated to 62° C. over 40 minutes and then the temperature was maintained for 120 minutes. 100 mL ethanol was added thereto to terminate the reaction. The remaining gas was purged, and 21.5 kg of a polypropylene polymer was obtained. This operation was repeated 5 times to give a base resin 4.

This resin had an MFR of 7 g/10 min, an ethylene content of 4.3 mol % and a melting point of 125° C.

(Production Method of Resin 5)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 0.9 kg of ethylene, and 3.0 L (in terms of volume in standard state) of hydrogen were added thereto, and the internal temperature was kept at 30° C. Then, 0.90 g (in terms of solid catalyst component) of a metallocene polymerization catalyst prepared by the method described in the production method of the resin 1 was pressed with argon into it to initiate polymerization, and heated to 70° C. over 40 minutes and then the temperature was maintained for 120 minutes. 100 mL ethanol was added thereto to terminate the reaction. The remaining gas was purged, and 20.1 kg of a polypropylene polymer was obtained. This operation was repeated 5 times to give a base resin 5.

This resin had an MFR of 7 g/10 min, an ethylene content of 2.4 mol % and a melting point of 134° C.

(Production Method of Resin 6)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 3.6 kg of ethylene, and 7.0 L (in terms of volume in standard state) of hydrogen were added thereto, and the internal temperature was kept at 30° C. Then, 0.40 g (in terms of solid catalyst component) of a metallocene polymerization catalyst prepared by the method described in the production method of the resin 1 was pressed with argon into it to initiate polymerization, and heated to 45° C. over 30 minutes and then the temperature was maintained for 60 minutes. 100 mL ethanol was added thereto to terminate the reaction. The remaining gas was purged, and 21.0 kg of a polypropylene polymer was obtained. This operation was repeated 5 times to give a base resin 6.

This resin had an MFR of 4 g/10 min, an ethylene content of 7.9 mol % and a melting point of 109° C.

(Production Method of Resin 7)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 2.3 kg of ethylene, and 6.0 L (in terms of volume in standard state) of hydrogen were added thereto, and the internal temperature was kept at 30° C. Then, 0.29 g (in terms of solid catalyst component) of a metallocene polymerization catalyst prepared by the method described in the production method of the resin 1 was pressed with argon into it to initiate polymerization, and heated to 60° C. over 30 minutes and then the temperature was maintained for 60 minutes. 100 mL ethanol was added thereto to terminate the reaction. The remaining gas was purged, and 20.2 kg of a polypropylene polymer was obtained. This operation was repeated 5 times to give a base resin 7.

This resin had an MFR of 8 g/10 min, an ethylene content of 5.6 mol % and a melting point of 120° C.

(Production Method of Resin 8)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 1.2 kg of ethylene, 3.6 kg of 1-butene, and 4.5 L (in terms of volume in standard state) of hydrogen were added thereto, and the internal temperature was kept at 30° C. Then, 1.30 g (in terms of solid catalyst component) of a metallocene polymerization catalyst prepared by the method described in the production method of the resin 1 was pressed with argon into it to initiate polymerization, and heated to 60° C. over 30 minutes and then the temperature was maintained for 60 minutes. 100 mL ethanol was added thereto to terminate the reaction. The remaining gas was purged, and 21 kg of a polypropylene polymer was obtained. This operation was repeated 5 times to give a base resin 8.

This resin had an MFR of 4 g/10 min, an ethylene content of 1.3 mol %, a 1-butene content of 3.1 mol %, and a melting point of 120° C.

(Production Method of Resin 9)

An autoclave made of stainless steel equipped with stirrer having an internal volume of 500 L was sufficiently substituted with a propylene gas at room temperature, and 210 L of dehydrated and deoxidized n-hexane was introduced as a polymerization solvent. Then, 220 g of diethyl aluminum chloride, 350 L (in terms of volume in standard state) of hydrogen, and 20 g of a Ziegler-Natta polymerization catalyst prepared by twice repeating the method described in the production method of the resin 2 were added under the condition of temperature at 45° C.

While the internal temperature of the autoclave was kept at 45° C., propylene was fed until the pressure became 0.7 MPa (G), and ethylene was fed at 1.0 kg/hr and 1-butene was fed at 5.7 kg/hr, to initiate the polymerization reaction. While ethylene and 1-butene were fed at a constant speed, propylene was fed at a pressure of 0.7 MPa, to polymerize the mixture for 150 minutes.

As a result, the total amounts of the fed monomers were 95.0 kg of propylene, 2.5 kg of ethylene and 14.3 kg of 1-butene.

While the autoclave was cooled to 25° C., the unreacted gas was released and the polymerization was terminated. The resulting slurry was transferred to a next chamber equipped with a stirring blade, and 50 L methanol was added, then the mixture was stirred at 55° C. for 30 minutes, 0.5 L of 20 wt % aqueous sodium hydroxide solution was added and stirred for 30 minutes, and 200 L of purified water was added and stirred for 1 hour, the aqueous layer was left and separated, and the catalyst residue was removed. The slurry was treated with a centrifuge, hexane was removed, and the mixture was dried for 3 hours with a drying machine at 60° C., to give 50.3 kg of a propylene polymer (product). This operation was repeated twice, to give a base resin 9.

This resin had an MFR of 5 g/10 min, an ethylene content of 4.7 mol %, a 1-butene content of 1.7 mol % and a melting point of 129° C.

(Production Method of Resin 10)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 6.6 kg of 1-butene, and 4.2 L (in terms of volume in standard state) of hydrogen were added, and the internal temperature was kept at 30° C. Then, 3.60 g (in terms of solid catalyst component) of a metallocene polymerization catalyst prepared by the method described in the production method of the resin 1 was pressed with argon into it to initiate polymerization, and heated to 60° C. over 30 minutes and then the temperature was maintained for 60 minutes. 100 mL ethanol was added thereto to terminate the reaction. The remaining gas was purged, and 21.8 kg of the polypropylene polymer was obtained. This operation was repeated 5 times to give a base resin 10.

This resin had an MFR of 5 g/10 min, a 1-butene content of 8.5 mol % and a melting point of 124° C.

(Production Method of Resin 11)

A stirring autoclave having an internal volume of 200 L was substituted sufficiently with propylene, and then 45 kg of sufficiently dehydrated liquefied propylene was introduced. 500 mL (0.12 mol) of triisobutyl aluminum/n-heptane solution, 1.4 kg of ethylene, and 6.5 L (in terms of volume in standard state) of hydrogen were added thereto, and the internal temperature was kept at 30° C. Then, 0.49 g (in terms of solid catalyst component) of a metallocene polymerization catalyst prepared by the method described in the production method of the resin 1 was pressed with argon into it to initiate polymerization, and heated to 62° C. over 40 minutes and then the temperature was maintained for 120 minutes. 100 mL ethanol was added thereto to terminate the reaction. The remaining gas was purged, and 51.0 kg of the polypropylene polymer was obtained. This operation was repeated 5 times to give a base resin 11.

This resin had an MFR of 25 g/10 min, an ethylene content of 3.7 mol % and a melting point of 128° C.

[Production of Polypropylene Resin Foamed Beads]

A base resin shown in Table 1 and 0.05 part by weight of zinc borate relative to 100 parts by weight of the base resin were fed to a single-screw extruder of 65 mmφ and melt and kneaded under heating, and the kneaded material was extruded in a strand state through a hole of a mouth ring attached to the end of the extruder and cooled with a water bath, and cut with a pelletizer to give resin particles in a weight of approximately 1 mg. Zinc borate was fed to the extruder using a master batch.

100 kg of the resin particles, 220 L of water, 300 g of kaolin as a dispersant, 200 g of sodium dodecylbenzenesulfonate, and 10 g of aluminum sulfate were charged into an autoclave equipped with a stirrer, 8 kg of carbon dioxide gas was pressed into it as a foaming agent, and the mixture was heated under stirring to a foaming temperature shown in Tables 2 and 3, and then kept under conditions shown in Tables 2 and 3, thereby regulating a high-temperature peak calorie, and then the content in the autoclave was released under atmospheric pressure to give polypropylene foamed beads. In Examples 9 and 10, 900 g and 1500 g of kaolin were used respectively, and in Comparative Example 6, 1800 g of kaolin was used. The foamed beads in Example 3 were obtained by introducing, in a container, the particles having an apparent density of 72 g/L in Example 2, then pressurizing them with air for 12 hours at 0.4 MPa (G), removing them, heating them with a heating steam at 0.03 MPa (G) for 15 seconds in a 2-stage foaming machine, to give foamed beads having an apparent density of 42 g/L. The internal pressure of the foamed beads just after pressurization with air was 0.3 MPa (G). The various physical properties such as apparent density and average cell diameter of the resulting foamed beads are shown in Tables 2 and 3.

[Production of Polypropylene Resin Foamed Bead Molded Article]

The foamed beads obtained by the method described above were charged into a mold of 250 mm in length, 200 mm in width and 50 mm in thickness, and subjected to molding under steam heating conditions shown in Tables 2 and 3 to give a molded article (however, a molded article could not be obtained in Comparative Example 6). In the heating method, both drain valves of the mold were opened, and in this state, steam was fed for 5 minutes in an exhaust process, followed by one-side heating at a pressure lower by 0.04 MPa (G) in the heating pressure, then reverse one-side heating at a pressure lower by 0.02 MPa (G) in the heating pressure, and heating at mold heating steam pressure shown in Tables 2 and 3. After heating was terminated, pressure was discharged, and cooled until the surface pressure by foam of the molded article became 0.04 MPa (G), and the die was opened to release the molded article. The resulting molded article was cured for 12 hours in an oven at 80° C., thereby giving a polypropylene resin foamed bead molded article. The apparent density and evaluation result of the resulting foamed bead molded articles are shown in Tables 2 and 3.

TABLE 2

| | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Resin | — | 5 | 4 | 4 | 7 | 8 | 9 | 10 | 11 | 4 | 4 |
| Foaming temperature | ° C. | 138 | 128 | 128 | 123 | 123 | 137 | 127 | 129 | 128 | 128 |
| Pressure in pot during foaming | MPa (G) | 2.8 | 2.8 | 2.8 | 2.8 | 3 | 2.8 | 3 | 2.9 | 2.8 | 2.8 |
| Apparent density of foamed beads | g/L | 77 | 72 | 42 | 72 | 72 | 69 | 72 | 85 | 72 | 72 |
| Amount of ash | ppm by weight | 680 | 630 | 660 | 670 | 650 | 800 | 600 | 700 | 1570 | 2760 |
| Average cell diameter | µm | 160 | 150 | 180 | 150 | 120 | 160 | 160 | 190 | 150 | 150 |
| Inherent peak calorie of foamed beads | J/g | 66 | 53 | 53 | 45 | 49 | 52 | 44 | 51 | 53 | 53 |
| High-temperature peak calorie of foamed beads | J/g | 8 | 6 | 6 | 7 | 5 | 6 | 6 | 9 | 6 | 6 |
| All endothermic peak total calories of foamed beads | J/g | 74 | 59 | 59 | 52 | 54 | 58 | 50 | 60 | 59 | 59 |
| Peak temperature of high-temperature peak | ° C. | 147 | 136 | 136 | 136 | 135 | 145 | 135 | 137 | 136 | 136 |
| Expansion ratio at 0.15 MPa (G) | — | 1.7 | 2.9 | 2.6 | 2.5 | 2.8 | 2.1 | 2.3 | 2.3 | 2.9 | 2.8 |
| Pressure of molding heating steam | MPa (G) | 0.18 | 0.14 | 0.14 | 0.12 | 0.12 | 0.12 | 0.13 | 0.1 | 0.14 | 0.14 |
| Molded article apparent density | g/L | 50 | 50 | 30 | 50 | 50 | 48 | 50 | 58 | 50 | 50 |
| Evaluation of foamed bead moldability | Secondary foaming pressure | MPa (G) | 0.18 | 0.14 | 0.14 | 0.12 | 0.14 | 0.12 | 0.13 | 0.1 | 0.14 | 0.14 |
| | Fusion completion pressure | MPa (G) | 0.16 | 0.12 | 0.12 | 0.12 | 0.12 | 0.12 | 0.12 | 0.1 | 0.13 | 0.14 |
| Evaluation of molded article | Appearance | — | ◯ | ◯ | ◯ | ◯ | ◯ | ◯ | ◯ | ◯ | ◯ | ◯ |
| | Compression properties | — | ◯ | ◯ | ◯ | ◯ | ◯ | ◯ | ◯ | ◯ | ◯ | ◯ |
| | Heat resistance | — | ◯ | ◯ | ◯ | ◯ | ◯ | ◯ | ◯ | ◯ | ◯ | ◯ |

TABLE 3

| | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Resin | — | 1 | 2 | 2 | 4 | 4 | 4 | 3 | 3 | 6 |
| Foaming temperature | ° C. | 147 | 151 | 150.5 | 125 | 130 | 128 | 145.5 | 148 | 112 |

TABLE 3-continued

|  | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Pressure in pot during foaming | MPa (G) | 2.6 | 2.5 | 2.8 | 2.6 | 3.2 | 2.8 | 3 | 2 | 3.4 |
| Apparent density of foamed beads | g/L | 72 | 72 | 77 | 72 | 72 | 72 | 90 | 72 | 72 |
| Amount of ash | ppm by weight | 700 | 650 | 700 | 640 | 660 | 3200 | 850 | 850 | 800 |
| Average cell diameter | μm | 190 | 180 | 160 | 170 | 160 | 150 | 200 | 220 | 120 |
| Inherent peak calorie of foamed beads | J/g | 79 | 72 | 71 | 47 | 54 | 50 | 55 | 61 | 41 |
| High-temperature peak calorie of foamed beads | J/g | 10 | 13 | 16 | 16 | 1 | 6 | 16 | 6 | 3 |
| All endothermic peak total calories of foamed beads | J/g | 89 | 85 | 87 | 63 | 55 | 56 | 71 | 67 | 44 |
| Peak temperature of high-temperature peak | °C. | 153 | 159 | 158 | 136 | 137 | 135 | 154 | 155 | 126 |
| Expansion ratio at 0.15 MPa (G) | — | 1.0 | 1.0 | 1.1 | 1.2 | 3.5 | 2.9 | 1.2 | 1.8 | 3.2 |
| Pressure of molding heating steam | MPa (G) | 0.32 | 0.32 | 0.36 | 0.24 | 0.09 | 0.22 | 0.24 | 0.16 | 0.09 |
| Molded article apparent density | g/L | 50 | 50 | 30 | 50 | 50 | 50 | 60 | 50 | 50 |
| Evaluation of foamed bead moldability — Secondary foaming pressure | MPa (G) | 0.32 | 0.32 | 0.36 | 0.24 | 0.08 | 0.14 | 0.24 | 0.16 | 0.09 |
| Evaluation of foamed bead moldability — Fusion completion pressure | MPa (G) | 0.3 | 0.32 | 0.36 | 0.22 | 0.09 | 0.22 | 0.22 | 0.16 | 0.09 |
| Evaluation of molded article — Appearance | — | ○ | ○ | ○ | ○ | X | X | ○ | ○ | ○ |
| Evaluation of molded article — Compression properties | — | ○ | ○ | ○ | ○ | X | X | ○ | X | X |
| Evaluation of molded article — Heat resistance | — | ○ | ○ | ○ | ○ | ○ | Δ | ○ | Δ | X |

[Evaluation of Foamed Bead Moldability]

In evaluation of foamed bead moldability in Tables 2 and 3, the molding steam pressure was changed, metal molding was carried out several times, and the resulting foamed bead molded articles were observed and evaluated in the following manner.

[Secondary Foaming Pressure]

The minimum forming pressure at which the foamed bead molded article is obtained with a smooth surface state with few foamed beads on the surface of the molded article.

[Fusion Completion Pressure]

The minimum forming pressure at which the foamed bead molded article having a material destruction ratio of 70% or more upon breakage of the molded article is obtained.

[Evaluation of Molded Article]

Evaluation of the foamed bead molded articles in Tables 2 and 3 was performed in the following manner.

[Appearance]

The surface of the foamed bead molded article was visually observed and evaluated under the following criteria.

○: The surface of the molded article is smooth to reproduce a die shape.

Δ: The surface of the molded article is slightly bend and dented, but nearly reproduces the die shape.

x: The surface of the molded article is bend and dented and fails to reproduce the die shape.

[Compression Properties]

Compression properties were evaluated on the basis of the arrival factor of compression stress at 50% strain of the foamed bead molded article, relative to the standard compression stress determined by the formula below. The compression stress at 50% strain of the foamed bead molded article is a value obtained by JIS K6767-1999 (ISO3386-1).

Standard compression stress (kPa) at 50% strain = $0.0742 \times D^2 + 3.874 \times D + 24.03$, provided D is the apparent density (g/L) of the foamed bead molded article.

○: The arrival factor at 50% strain relative to the standard compression stress is 80% or more.

Δ: The arrival factor at 50% strain relative to the standard compression stress is 70% or more and less than 80%.

x: The arrival factor at 50% strain relative to the standard compression stress is less than 70%.

[Heat Resistance]

A heat resistance test at 110° C. by "Dimensional Stability Method B at High-Temperature" in JIS K6767-1999 was carried out, and heat resistance was evaluated under the following criteria:

○: Heating dimensional change ratio is less than 5%.

Δ: Heating dimensional change ratio is 5% or more and less than 10%.

x: Heating dimensional change ratio is 10% or more.

In Comparative Examples 1, 2 and 3 in Table 3, the melting point of the base resin is higher than the melting point specified by the present invention, and even if steam with a saturation vapor pressure of 0.2 MPa (G) higher than the compression pressure of the polystyrene resin foamed bead molding apparatus is introduced, the foamed beads are not foamed (secondary foaming) and fused with one another in the mold and an excellent foamed bead molded article cannot be obtained.

The same base resin as in Examples 2, 3, 9 and 10 has been used in Comparative Examples 4 and 5, but the foaming temperature at the time of manufacturing the foamed beads is low in Comparative Example 4 and thus the endothermic peak calories at the side of high temperature is too high, and molding heating steam pressure is as high as 0.24 MPa (G), and the foamed bead molded article is inferior inflexibility, and in Comparative Example 5, the foaming temperature at the time of manufacturing the foamed beads is high so that the endothermic peak calorie at the time of high temperature is too low, the shrinkage of the foamed bead molded article is too high, and the molded article cannot reproduce the mold form, and any foamed bead molded article cannot be obtained.

The same resin as in Examples 2, 3, 9 and 10 has been used in Comparative Example 6, but the temperature of the atmosphere at the time of foaming is not regulated, and the temperature is 100° C. or more, and given the usual amount of an dispersant, the foamed beads obtained by discharge from an autoclave is adhered mutually and thus the amount of the dispersant is increased. As a result, the amount of ash on the surface of the foamed beads becomes 3000 ppm or more, and a heating steam of 0.2 MPa (G) or more is necessary, and the shrinkage of the molded article becomes higher.

The melting point of the base resin in Comparative Example 7 is in the melting point range specified in the present invention, but there is concerned that the physical properties of the molded article because the Olsen flexural modulus is low, the physical properties deterioration is prevented due to high peak calorie. However, because the high-temperature peak calorie is too high, the molding heating steam pressure is as high as 0.24 MPa (G), and the desired object of the present invention cannot be achieved.

The melting point of the base resin in Comparative Example 8 is in the melting point range specified in the present invention, but the molded article which satisfies compression properties and heat resistance is not obtained because the Olsen flexural modulus is low. The peak temperature (i.e. apex temperature) of the high-temperature peak of the foamed beads in the base resin in Comparative Example 9 is not equal to and higher than 130° C. and cannot form a molded article satisfying physical properties and heat resistance.

INDUSTRIAL APPLICABILITY

The polypropylene resin foamed beads of the present invention can give a foamed bead molded article excellent in mold reproduction at low molding temperature, mold dimensional stability, appearance such as surface smoothness and in mutual fusion of foamed beads, and the resulting foamed bead molded article has excellent compression property, rigidity and heat resistance. Further, the foamed beads of the present invention and its molded article are also excellent in easy combustibility and easy recyclability. The polypropylene resin foamed beads of the present invention enable molding at low molding temperature at the time of molding, thereby enabling significant reduction in energy cost during molding as compared with the conventional molding of polypropylene resin foamed beads and simultaneously enabling use of steam at low saturation vapor pressure during molding, and thus the clamping pressure of a molding machine can be reduced and the thickness of a mold can be made thin so that the molding machine and the mold can be designed compliant at low pressure, and therefore, inexpensive design is feasible in molding facilities, and existing facilities for molding of polystyrene resin foamed beads are usable for polypropylene resin foamed beads.

The invention claimed is:

1. Polypropylene resin foamed beads comprising a polypropylene resin having a melting point of 115 to 135° C. and an Olsen flexural modulus of 500 MPa to 780 MPa, wherein a relationship between the Olsen flexural modulus of the polypropylene resin and the melting point of the resin satisfies the formula:

(Olsen flexural modulus [MPa]+1400)/15 resin melting point (° C.) (Olsen flexural modulus [MPa]+1750)/20, and wherein an amount of ash on the surfaces of the foamed beads is 3,000 ppm by weight or less (including 0), the foamed beads show one or more endothermic peaks having a peak temperature in a temperature region not higher than the melting point of the resin and one or more endothermic peaks having a peak temperature in a temperature region exceeding the melting point of the resin and not lower than 130° C., in a first DSC curve obtained by heating 1 to 3 mg of polypropylene resin foamed beads when heated from room temperature to 200° C. at a rate of temperature rise of 10° C./min with a heat flux differential scanning calorimeter, and the total calorie of the endothermic peak is in the range of 2 to 12 J/g.

2. The polypropylene resin foamed beads according to claim 1, wherein an expansion ratio (maximum expansion particle ratio by heating/expansion particle ratio before heating) by heating with steam at saturation vapor pressure of 0.15 MPa (G) is 1.3 to 3.5.

3. The polypropylene resin foamed beads according to claim 1, wherein an average cell diameter of the polypropylene resin foamed beads is 50 to 350 μm.

4. The polypropylene resin foamed beads according to claim 1, wherein the polypropylene resin is a copolymer of propylene and ethylene and/or α-olefin having 4 to 20 carbon atoms.

5. The polypropylene resin foamed beads according to claim 1, wherein the melting point of the polypropylene resin is 115° C. or more and less than 130° C.

6. The polypropylene resin foamed beads according to claim 1, wherein the melting point of the polypropylene resin is 130° C. to 135° C.

7. A polypropylene resin foamed bead molded article which is prepared by molding the polypropylene resin foamed beads according to claim 1.

* * * * *